US008989795B2

(12) United States Patent
Kimura et al.

(10) Patent No.: US 8,989,795 B2
(45) Date of Patent: Mar. 24, 2015

(54) METHOD OF CONTROLLING BASE STATION APPARATUS AND BASE STATION APPARATUS CONTROLLED BY SAME

(75) Inventors: Bun Kimura, Yokohama (JP); Tetsuo Tomita, Setagaya (JP)

(73) Assignee: Fujitsu Limited, Kawasaki (JP)

( * ) Notice: Subject to any disclaimer, the term of this patent is extended or adjusted under 35 U.S.C. 154(b) by 418 days.

(21) Appl. No.: 13/614,727

(22) Filed: Sep. 13, 2012

(65) Prior Publication Data

US 2013/0012257 A1    Jan. 10, 2013

Related U.S. Application Data

(63) Continuation of application No. PCT/JP2010/054687, filed on Mar. 18, 2010.

(51) Int. Cl.
| | |
|---|---|
| H04B 7/00 | (2006.01) |
| H04W 52/28 | (2009.01) |
| H04W 52/34 | (2009.01) |
| H04W 88/08 | (2009.01) |
| H04W 36/16 | (2009.01) |

(52) U.S. Cl.
CPC .......... *H04W 52/283* (2013.01); *H04W 52/343* (2013.01); *H04W 88/08* (2013.01); *H04W 36/165* (2013.01)
USPC ............... 455/522; 455/68; 455/69; 455/443; 455/444

(58) Field of Classification Search
USPC ............... 455/522, 67.11, 68–70, 126, 127.1, 455/443, 444
See application file for complete search history.

(56) References Cited

U.S. PATENT DOCUMENTS

| | | | |
|---|---|---|---|
| 6,119,018 A | 9/2000 | Kondo | |
| 7,746,839 B2 * | 6/2010 | Jalil et al. | 370/343 |
| 2008/0146174 A1 * | 6/2008 | Flowers | 455/127.1 |
| 2009/0168798 A1 * | 7/2009 | Jinxia et al. | 370/461 |
| 2010/0165907 A1 * | 7/2010 | Chu et al. | 370/312 |

FOREIGN PATENT DOCUMENTS

| | | |
|---|---|---|
| JP | 9-326754 A | 12/1997 |
| JP | 10-13326 A | 1/1998 |
| JP | 2000-82992 A | 3/2000 |

(Continued)

OTHER PUBLICATIONS

Japanese Office Action dated Jun. 25, 2013, issued in corresponding Japanese Patent Application No. 2012-505396, w/ English translation.

(Continued)

*Primary Examiner* — Dominic E Rego
(74) *Attorney, Agent, or Firm* — Westerman, Hattori, Daniels & Adrian, LLP

(57) ABSTRACT

A control method for controlling base station apparatuses used in a communication system comprising a first base station apparatus, a second base station apparatus, and one or more mobile station apparatuses, including determining whether or not a first condition relating to the number of the mobile station apparatuses positioned in the overlapping area of the cover area of the first base station apparatus and the cover area of the second base station apparatus and to respective output power of the mobile station is satisfied, and outputting a radio signal from the second base station apparatus if the first condition is satisfied.

13 Claims, 31 Drawing Sheets

(56) References Cited

FOREIGN PATENT DOCUMENTS

| | | |
|---|---|---|
| JP | 2000-197107 A | 7/2000 |
| JP | 2001-36464 A | 2/2001 |
| JP | 2001-169325 A | 6/2001 |
| JP | 2008-288932 A | 11/2008 |
| JP | 2009-182401 A | 8/2009 |
| WO | 2009/039426 A2 | 3/2009 |
| WO | 2009/039439 A2 | 3/2009 |
| WO | 2009/070608 A2 | 6/2009 |

OTHER PUBLICATIONS

International Search Report for PCT/JP2010/054687, mailing date of Jun. 1, 2010.

* cited by examiner

METHOD OF CONTROLLING BASE STATION APPARATUS AND BASE STATION APPARATUS CONTROLLED BY SAME

CROSS-REFERENCE TO RELATED APPLICATIONS

This application is a continuation application based on International application No. PCT/JP2010/054687, filed on Mar. 18, 2010, the entire contents of which are incorporated herein by reference.

FIELD

Embodiments disclosed herein relate to a method of controlling a base station apparatus used in a communication system including a first base station apparatus and a second base station apparatus, and one or more mobile station apparatuses, and to a base station apparatus used in such a communication system.

BACKGROUND

A base station apparatus receives a reception quality signal from a mobile station apparatus. The mobile station apparatus also receives a reception quality signal from the base station apparatus. The base station apparatus and the mobile station apparatus adjust the power intensity of radio signal outputted based on the received reception quality signal.

A radio communication system has been proposed in which transmission power of mobile terminal is suppressed to reduce power consumption. Such a radio communication system includes a communication area consisting of a plurality of cells in which a base station can communicate with mobile terminals. In this communication system, a base station has an antenna that permits a beam to be operated for each cell, so that the antenna beam can be successively operated for respective cells to perform controlled communication with mobile terminals including position registration or communication timing for information communication in cell unit. The base station performs information communication with mobile terminals based on the communication timing.
Related art is disclosed in Japanese Laid-open Patent Publication No. H10-13326.

SUMMARY

According to an embodiment, there is provided a control method for controlling base station apparatuses used in a communication system comprising a first base station apparatus, a second base station apparatus, and one or more mobile station apparatuses. the control method includes determining whether or not a first condition relating to the number of the mobile station apparatuses positioned in the overlapping area of the cover area of the first base station apparatus and the cover area of the second base station apparatus and to respective output power of the mobile station is satisfied, and outputting radio signal from the second base station apparatus if the first condition is satisfied.

According to another embodiment, there is provided a base station apparatus used as a first base station apparatus in a communication system including the first base station apparatus, a second base station apparatus, and one or more mobile station apparatuses. The first base station apparatus includes a first determination unit that determines whether or not a first condition relating to the number of the mobile station apparatuses positioned in the overlapping area of the cover area of the first base station apparatus and the cover area of the second base station apparatus and respective output power of the mobile station apparatuses is satisfied, and an instruction signal transmission unit which transmits an instruction signal for causing the second base station apparatus to output radio signal if the first condition is satisfied.

According to another embodiment, there is provided a base station apparatus used as a second base station apparatus in a communication system including the first base station apparatus, a second base station apparatus, and one or more mobile station apparatuses. The second base station apparatus includes a second determination unit determines whether or not a second condition relating to the number of the mobile station apparatuses positioned in the overlapping area of the cover area of the first base station apparatus and the cover area of the second base station apparatus and respective output power of the mobile station apparatuses is satisfied; and an output control unit that stops output of radio signal from the second base station apparatus if the second condition is satisfied.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
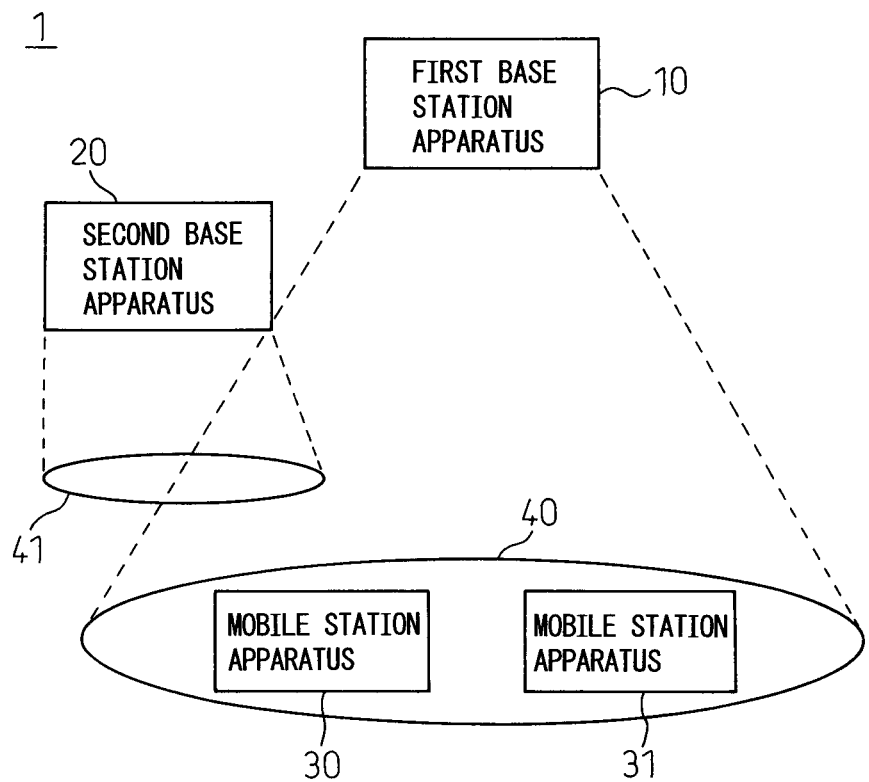
FIG. 1 is a view depicting a first exemplary construction of a communication system.

The present invention will be described below with reference to appended drawings illustrating preferred embodiments thereof. FIG. 1 is a view depicting a first exemplary construction of a communication system. The communication system 1 includes a first base station apparatus 10, a second base station apparatus 20, and mobile station apparatuses 30 and 31.

Reference numbers 40 and 41 denote cover areas of the first base station apparatus 10 and the second base station apparatus 20, respectively. The first base station apparatus 10 and the second base station apparatus 20 perform radio communication with the mobile station apparatuses 30 and 31 positioned in their cover areas, respectively. The cover area 40 of the first base station apparatus 10 and the cover area 41 of the second base station apparatus 20 have overlapping area. The first base station apparatus 10 may be, for example, a macro-cell base station apparatus covering a macro-cell as the cover area 40. The second base station apparatus 20 may be, for example, a femtocell base station apparatus covering a femtocell as the cover area 41.

Figure 2:
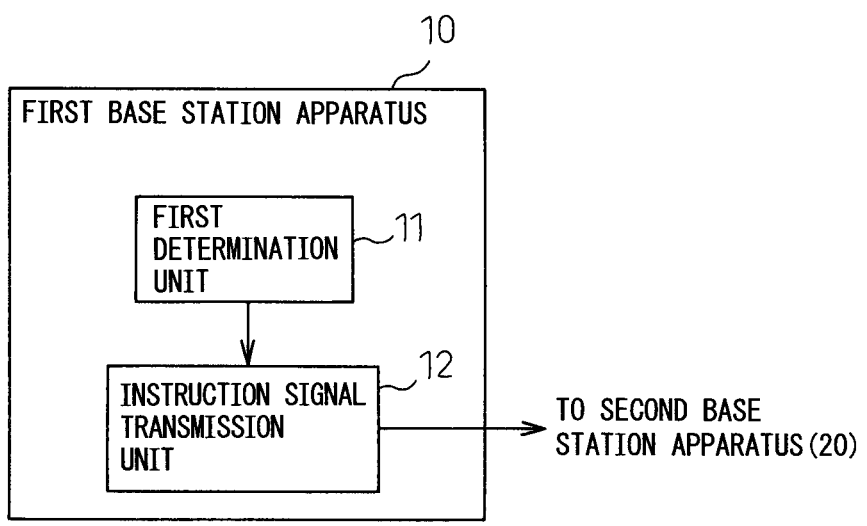
FIG. 2 is a view depicting a first exemplary construction of a first base station apparatus depicted in FIG. 1.

FIG. 2 is a view depicting a first exemplary construction of the first base station apparatus 10 depicted in FIG. 1. The first base station apparatus 10 includes a first determination unit 11, and an instruction signal transmission unit 12. The first determination unit 10 determines whether or not a prescribed first condition relating to number of mobile station apparatuses positioned in the overlapping area of the cover area 40 of the first base station apparatus 10 and the cover area 41 of the second base station apparatus 20 and to respective output power of mobile station apparatuses is satisfied. If the prescribed first condition is satisfied, the instruction signal transmission unit 12 transmits an instruction signal for causing the second base station apparatus 20 to output radio signal.

The prescribed first condition may be, for example, a condition that is satisfied when number of mobile station apparatuses positioned in the above-described overlapping area and outputting at prescribed output power exceeds a prescribed threshold. The condition specified in this manner may be denoted as the condition A1 in the description that follows.

The prescribed first condition may be defined by combining plural conditions Al respectively defined for plural output power in logical product or logical sum. The condition specified in this manner may be denoted as the condition A2 in the description that follows.

The prescribed first condition may be a condition that is satisfied when a total sum of the number of mobile station apparatuses positioned in the above-described overlapping area and outputting signal at each power output value for plural power output values not lower than a prescribed first threshold multiplied by each power output value exceeds a prescribed second threshold. The condition specified in this manner may be denoted as the condition A3 in the description that follows.

Figure 3:
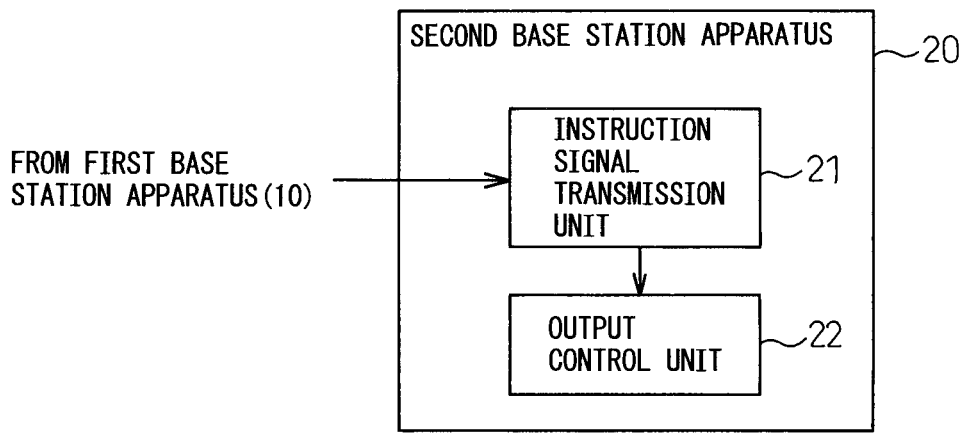
FIG. 3 is a view depicting a first exemplary construction of a second base station apparatus depicted in FIG. 1.

FIG. 3 is a view depicting a first exemplary construction of a second base station apparatus 20 depicted in FIG. 1. The second base station apparatus 20 includes an instruction signal reception unit 21 and an output control unit 22. The instruction signal reception unit 21 receives an instruction signal transmitted from the first base station apparatus 10. When the instruction signal for causing radio signal to be outputted, the output control unit 22 causes the second base station apparatus 20 to output radio signal.

Figure 4:
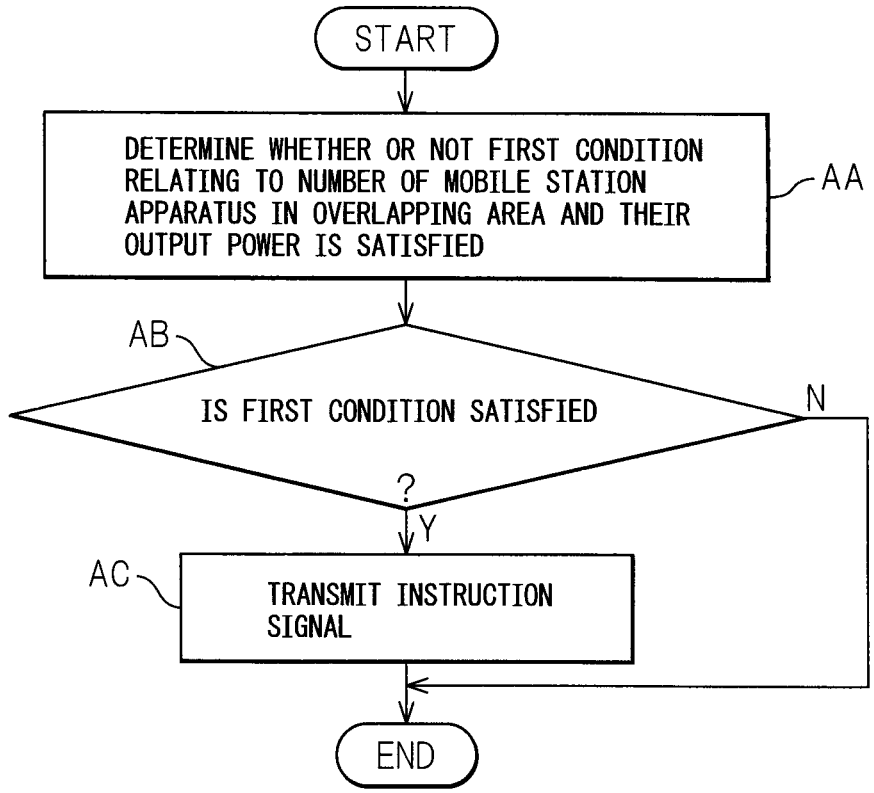
FIG. 4 is a view illustrating the processing in the first base station apparatus depicted in FIG. 2.

FIG. 4 is a view illustrating the processing executed in the first base station apparatus 10 depicted in FIG. 2. In other embodiments, each of the following operations AA to AC may be a step.

In operation AA, the first determination unit 11 determines whether or not the prescribed first condition relating to the number of mobile station apparatuses positioned in the overlapping area of the cover area 40 of the first base station apparatus 10 and the cover area 41 of the second base station apparatus 20 and to respective output power of mobile station apparatuses is satisfied. If the prescribed first condition is satisfied (operation AB: Y), the processing proceeds to operation AC. If the prescribed first condition is not satisfied (operation AB: N), the processing is terminated. In operation AC, the instruction signal transmission unit 12 transmits an instruction signal to cause the second base station apparatus 20 to output a radio signal.

Figure 5:
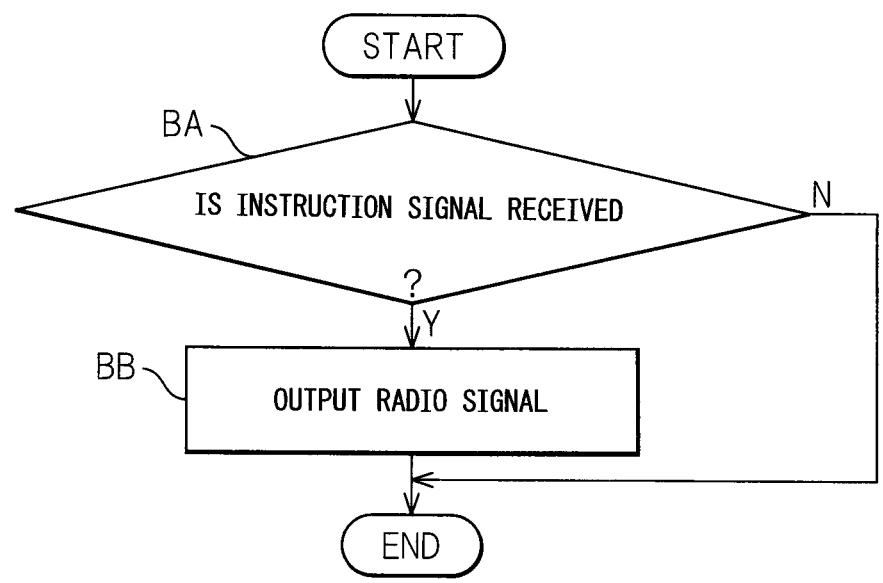
FIG. 5 is a view illustrating the processing in the second base station apparatus depicted in FIG. 3.

FIG. 5 is a view illustrating the processing executed in the second base station apparatus 20 depicted in FIG. 3. In other embodiments, each of the following operations BA to BB may be a step. In operation BA, the instruction signal reception unit 21 attempts to receive the instruction signal transmitted from the base station 10. If the instruction signal is received (operation BA: Y), the processing proceeds to operation BB. If the instruction signal is not received (operation BA: N), the processing is terminated. In operation BB, the output control unit 22 causes the second base station apparatus 20 to output a radio signal.

With the present embodiment, when a number of mobile station apparatuses having large output power of radio wave increases in radio communication with the first base station apparatus, the second base station apparatus 20 can cover these mobile station apparatuses. Thus, with the present embodiment, power consumption of mobile station apparatuses can be reduced by decreasing power intensity of radio waves outputted by mobile station apparatuses.

Figure 6:
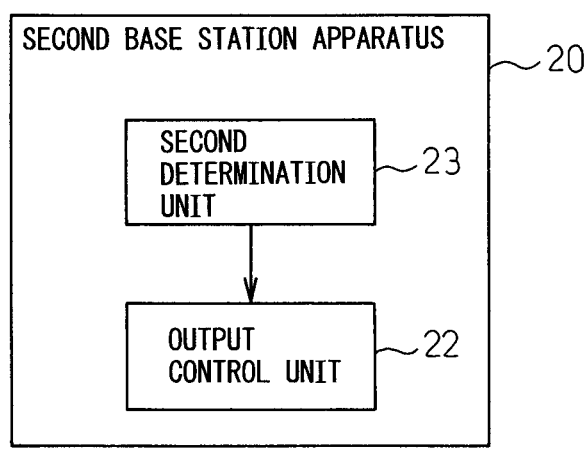
FIG. 6 is a view depicting a second exemplary construction of a second base station apparatus depicted in FIG. 1.

Next, other exemplary embodiment of the second base station apparatus 20 will be described. FIG. 6 is a view depicting a second exemplary construction of the second base station apparatus 20 depicted in FIG. 1. The second base station apparatus 20 includes an output control unit 22 and a second determination unit 23. The second base station apparatus 20 may further have the construction as depicted in FIG. 3. The second base station apparatus 20 may execute the processing described above with reference to FIG. 3.

The second determination unit 23 determines whether or not a prescribed second condition relating to the number of mobile station apparatuses positioned in the overlapping area of the cover area 40 of the first base station apparatus 10 and the cover area 41 of the second base station apparatus 20 and to respective output power of mobile station apparatuses is satisfied. If the prescribed second condition is satisfied, the output control unit 22 causes the second base station apparatus 20 to stop output of radio signal.

The prescribed second condition may be, for example, a condition that is satisfied when the number of mobile station apparatuses positioned in the above-described overlapping area and outputting signal at prescribed output power exceeds a prescribed threshold. The condition specified in this manner may be denoted as condition B1 in the description that follows.

The prescribed second condition may be defined by combining plural conditions B1 respectively defined for plural output power in logical product or logical sum. The condition specified in this manner may be denoted as condition B2 in the description that follows.

The prescribed second condition may be, for example, a condition that is satisfied when the number of mobile station apparatuses positioned in the above-described overlapping area and outputting signal at prescribed output power is less than a prescribed threshold. The condition specified in this manner may be denoted as condition B3 in the description that follows.

The prescribed second condition may be defined by combining plural conditions B3 respectively defined for plural output power in logical product or logical sum. The condition specified in this manner may be denoted as condition B4 in the description that follows.

The prescribed second condition may be defined by combining one or more conditions B1 and one or more conditions B3 in logical product or logical sum. The condition specified in this manner may be denoted as condition B5 in the description that follows.

The prescribed second condition may be, for example, a condition that is satisfied when the total sum of the number of mobile station apparatuses positioned in the above-described overlapping area and outputting signal at each output power of plural output power values not greater than a prescribed first threshold multiplied by respective output power value exceeds a prescribed second threshold. Condition specified in this manner may be denoted as condition B6 in the description that follows.

Figure 7:
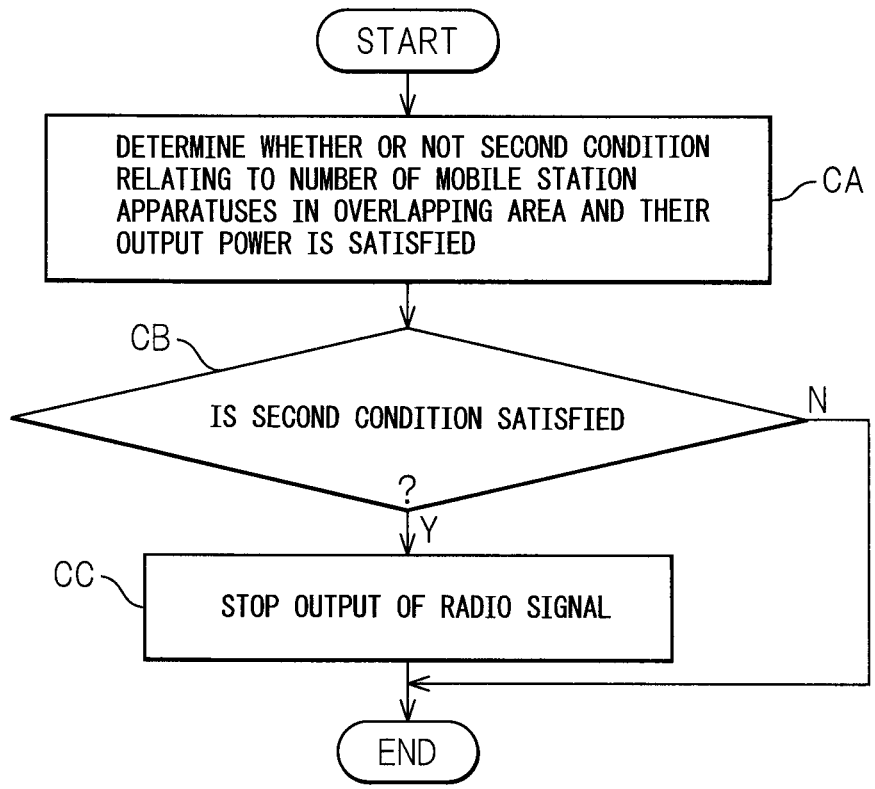
FIG. 7 is a view illustrating the processing in the second base station apparatus depicted in FIG. 6.

FIG. 7 is a view illustrating the processing executed in the second base station apparatus 20 depicted in FIG. 6. In other embodiments, each of the following operations CA to CC may be a step.

In operation CA, the second determination unit 23 determines whether or not the prescribed second condition relating to the number of mobile station apparatuses positioned in the overlapping area of the cover area 40 of the first base station apparatus 10 and the cover area 41 of the second base station apparatus 20 and the respective output power of mobile station apparatuses is satisfied. If the prescribed second condition is satisfied (operation CB: Y), the processing proceeds to operation CC. If the prescribed second condition is not satisfied (operation CB: N), the processing is terminated. In operation CC, the output control unit 22 causes the second base station apparatus 20 to stop outputting of radio signal.

In accordance with the present exemplary embodiment, after outputting of radio wave by the second base station apparatus 20 is started, when large power saving effect by reduction of output power by mobile station apparatuses can no longer be expected from continued outputting of radio wave, outputting of radio wave from the second base station apparatus 20 can be stopped. Thus, with the present exemplary embodiment, waste of power consumption by the second base station apparatus 20 is reduced, and decrease of overall power consumption of the communication system 1 is possible.

Figure 8:
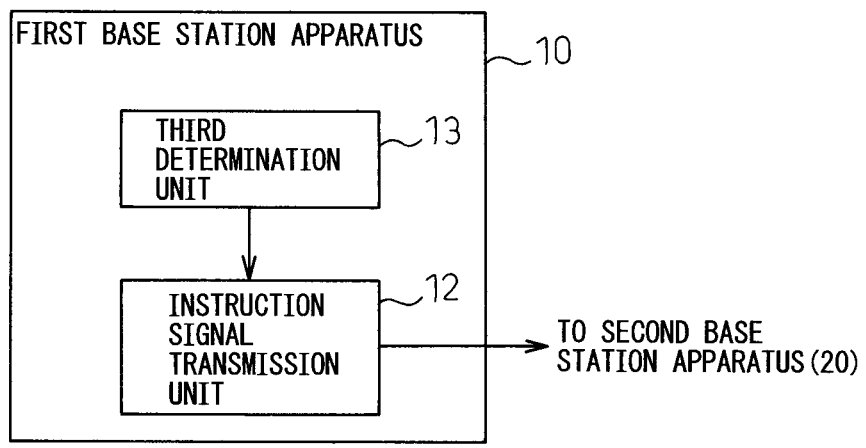
FIG. 8 is a view depicting a second exemplary construction of a first base station apparatus depicted in FIG. 1.

Next, another exemplary embodiment of the first base station apparatus 10 and the second base station apparatus 20 will be described. FIG. 8 is a view depicting a second exemplary construction of the first base station apparatus 10 depicted in FIG. 1. The first base station apparatus 10 includes an instruction signal transmission unit 12 and a third determination unit 13. The first base station apparatus 10 may further include the construction as depicted in FIG. 2. The first base station apparatus 10 may execute the above-described processing relating to the construction in FIG. 2.

The third determination unit 13 determines whether or not it is better that the second base station apparatus 20 continues to output radio wave. For example, the first base station apparatus 10 may determine whether or not it is better that the second base station apparatus 20 continues to output radio wave according as the above-described prescribed first condition is satisfied or not.

Alternatively, for example, the first base station apparatus 10 may include a reception unit for receiving the position information of a mobile station apparatus 30 measured by the mobile station apparatus 30. The third determination unit 13 predicts, based on the change of the position information of the mobile station apparatus 30, that the mobile station apparatus 30 is moving toward the overlapping area of the cover areas 40 and 41, and whether or not the mobile station apparatus 30 will be positioned in the overlapping area within a prescribed time period. The third determination unit 13 may determine whether or not a condition defined in the same manner as in the above-described prescribed first condition relating to the number of the mobile station apparatuses 30 predicted to be positioned in the overlapping area and respective output power of mobile station apparatuses is satisfied. The third determination unit 13 may determine, in accordance with the result of this determination, whether or not it is better that the second base station apparatus 20 continues to output radio signal.

If the third determination unit determines that it is better that the second base station apparatus 20 continues to output radio signal, the instruction signal transmission unit 12 outputs the instruction signal for causing the second base station apparatus 20 to continue to output radio signal.

Figure 9:
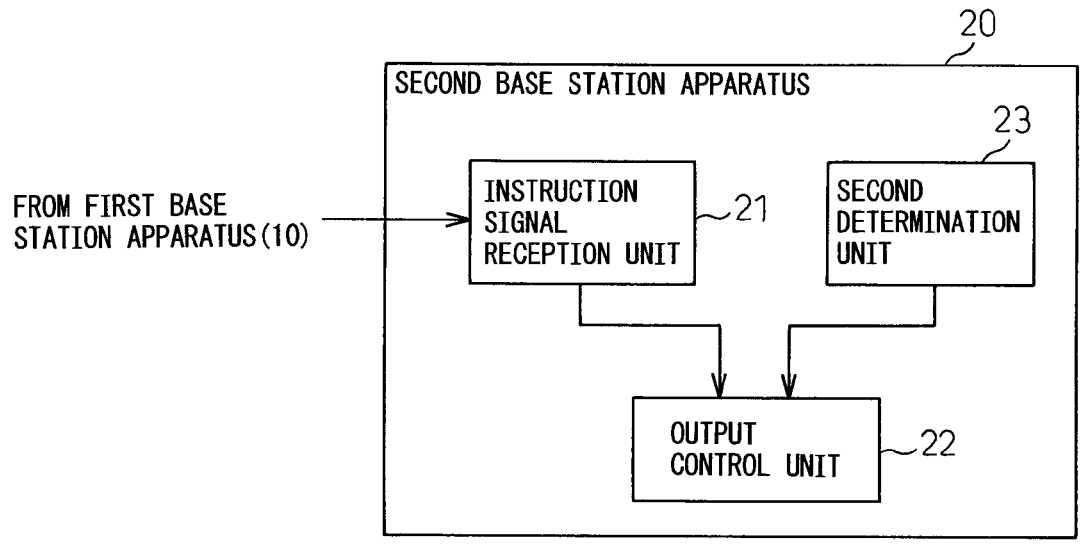
FIG. 9 is a view depicting a third exemplary construction of a second base station apparatus depicted in FIG. 1.

FIG. 9 is a view depicting a third exemplary construction of the second base station apparatus 20 depicted in FIG. 1. The second base station apparatus 20 includes an instruction signal reception unit 21, an output control unit 22, and a second determination unit 23. The second base station apparatus 20 may execute the processing described above with reference to the construction of FIG. 3 and/or the construction of FIG. 6.

The instruction signal 21 receives an instruction signal for causing outputting of a radio signal to be continued from the first base station apparatus 10. The second determination unit 23 determines whether or not the prescribed second condition described above relating to the number of mobile station apparatuses in the overlapping area of the cover area 40 Of the first base station apparatus 10 and the cover area 41 Of the second base station apparatus 20 is satisfied.

When an instruction signal is received, the output control unit 22 causes the second base station apparatus 20 to continue to output a radio signal irrespective of whether or not the prescribed second condition is satisfied. When an instruction signal is not received and the prescribed second condition is satisfied, the output control unit 22 causes the second base station apparatus 20 to stop outputting of the radio signal.

Figure 10:
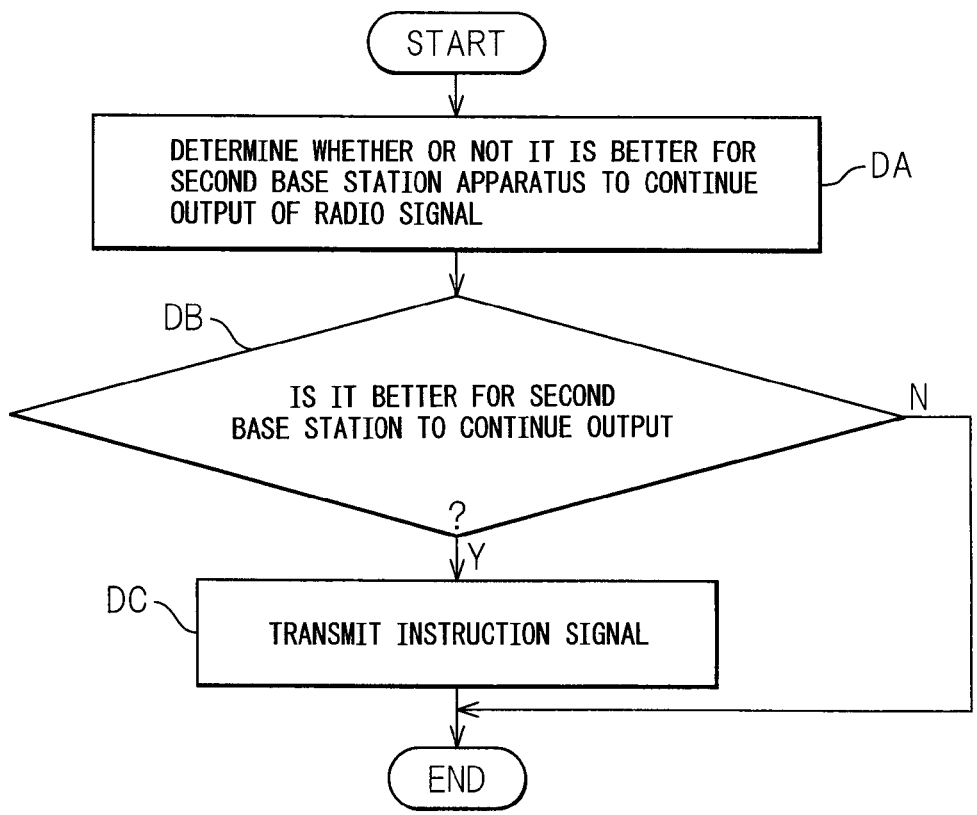
FIG. 10 is a view illustrating the processing in the first base station apparatus depicted in FIG. 8.

FIG. 10 is a view illustrating the processing executed in the first base station 10 depicted in FIG. 1. In other embodiments, each of the following operations DA to DC may be a step. In operation DA, the third determination unit 13 determines whether or not it is better for the second base station apparatus 20 to continue to output radio signal.

If the third determination unit 13 determines that it is better for the second base station apparatus 20 to continue to output a radio signal (operation DB: Y), the processing proceeds to operation DC. Otherwise (operation DB: N), the processing is terminated. In operation DC, the instruction signal transmission unit 12 transmits an instruction signal for causing the second base station apparatus 20 to continue to output the radio signal.

Figure 11:
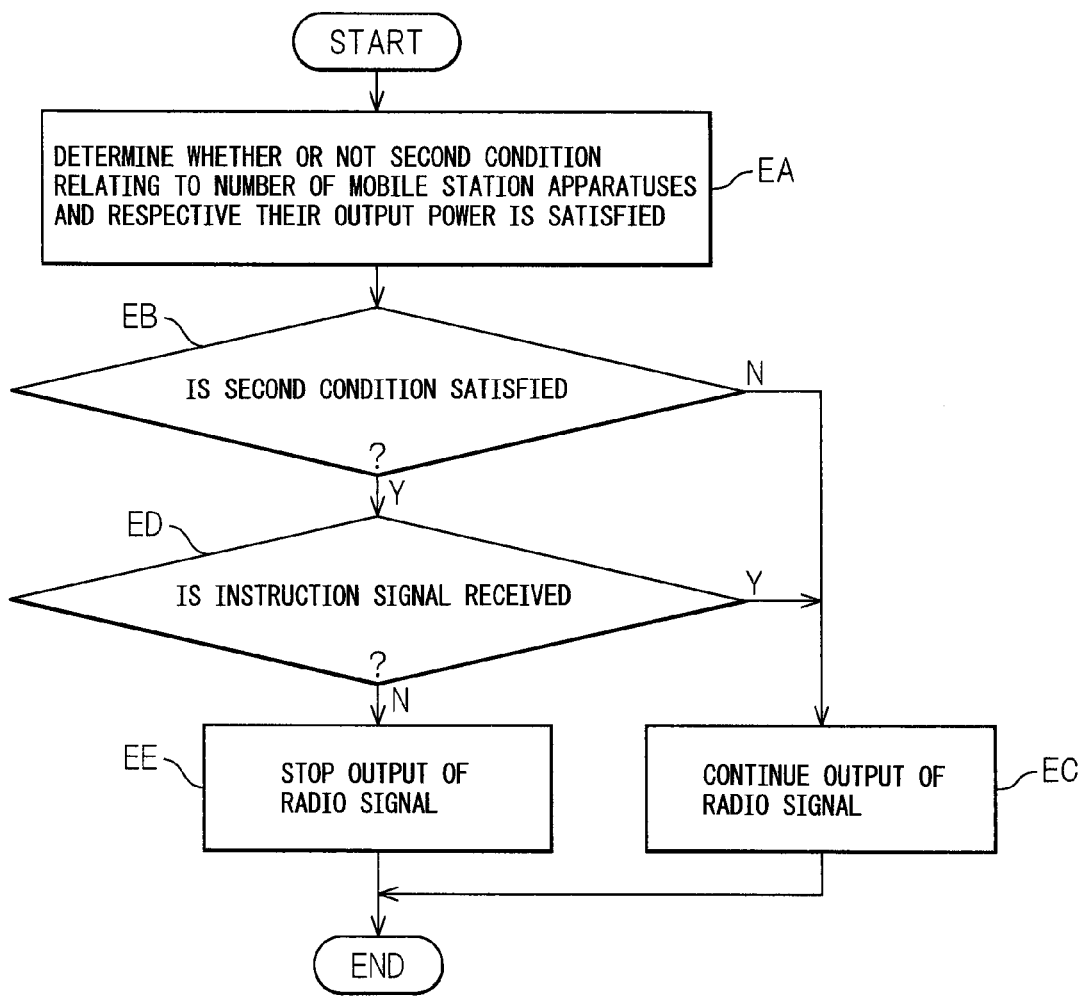
FIG. 11 is a view illustrating the processing in the second base station apparatus depicted in FIG. 9.

FIG. 11 is a view illustrating the processing executed in the second base station 20 depicted in FIG. 9. In other embodiments, each of the following operations EA to EE may be a step. In operation EA, the second determination unit 23 determines whether or not the prescribed second condition as described above relating to the number of mobile station apparatuses positioned in the overlapping area of the cover area 40 of the first base station apparatus 10 and the cover area 41 of the second base station apparatus 20 and to the respective output power of mobile station apparatuses is satisfied.

If the prescribed second condition is satisfied (operation EB: Y), the processing proceeds to operation ED. If the prescribed second condition is not satisfied (operation EB: N), the processing proceeds to operation EC. In operation EC, the output control unit 22 causes the second base station 20 to continue to output a radio signal.

In operation ED, the instruction signal reception unit 21 attempts to receive an instruction signal transmitted from the first base station apparatus 10. When the instruction signal is received (operation ED: Y), the processing proceeds to operation EC. As a result, the second base station 20 continues to output radio signal. When the instruction signal is not received (operation ED: N), the processing proceeds to operation EE. In operation EE, the output control unit 22 causes the second base station apparatus 20 to stop output of radio signal.

With the present exemplary embodiment, when the condition for outputting radio signal from the second base station apparatus 20 and the condition for stopping output of radio signal compete with each other, output of a radio signal can be continued. Therefore, after output of the radio signal from the second base station 20 is started, the occasion for stopping output of radio signal due to temporary situation is reduced. As a result, deterioration of communication quality due to intermittent output of radio signal from the second base station apparatus 20 can be avoided.

Figure 12:
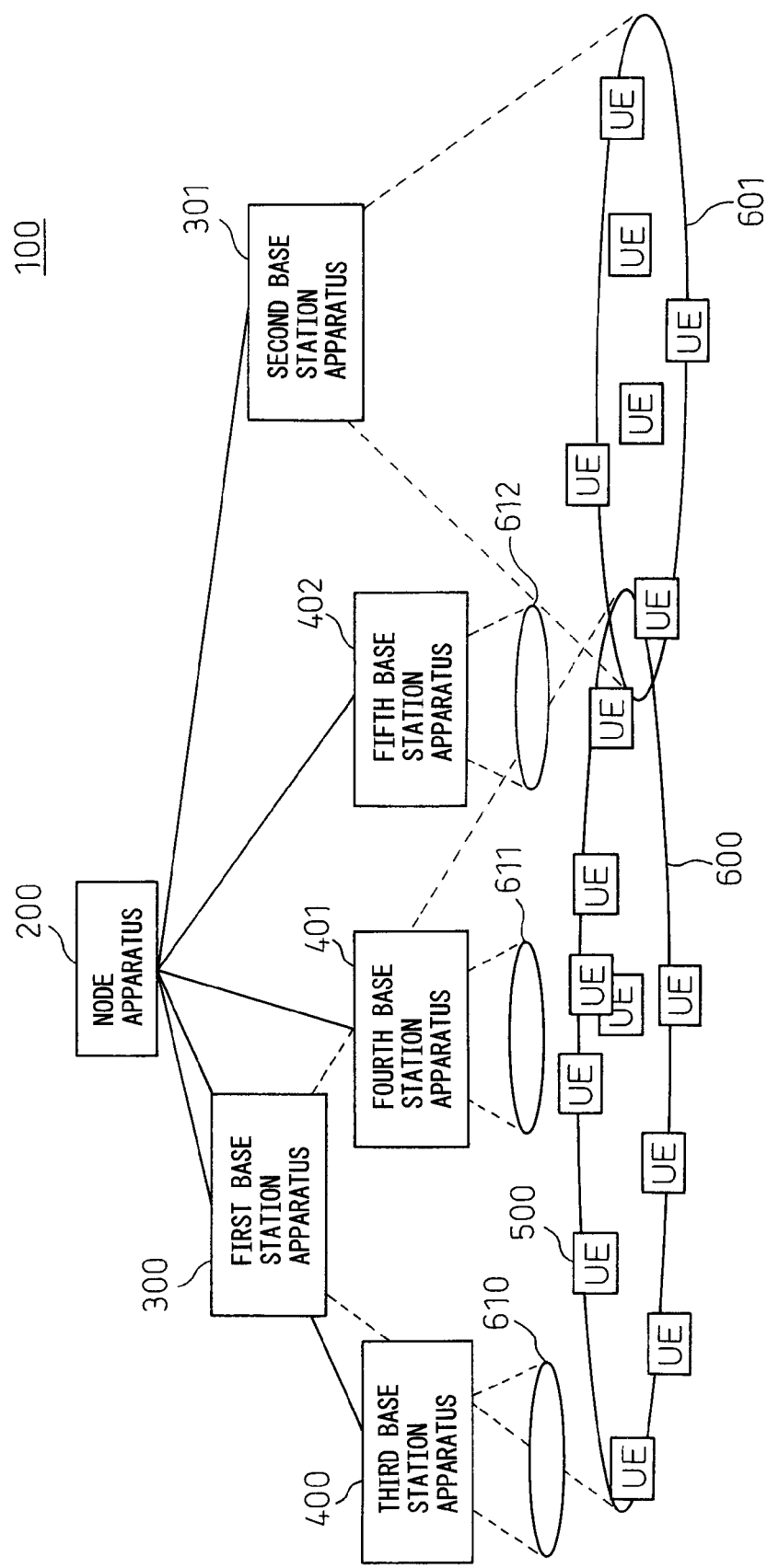
FIG. 12 is a view depicting a second exemplary construction of a communication system.

Next, a communication system according to other exemplary embodiment will be described. FIG. 12 is a view depicting a second exemplary construction of the communication system. The communication system 100 includes a node apparatus 200, a first base station apparatus 300, a second base station apparatus 301, a third base station apparatus 400 to a fifth base station apparatus 402, and one or more mobile station apparatuses 500. In FIG. 12 and drawings that follow, a mobile station apparatus may be denoted as UE.

Reference numerals 600 and 601 denote cover areas of the first base station 10 and the second base station apparatus 20, respectively. Reference numerals 610 to 612 denote cover areas of the third base station apparatus 400 to the fifth base station apparatus 402, respectively. Each of the base station apparatus 300 to 402 performs radio communication with mobile station apparatuses 500 positioned in respective cover area. The node apparatus 200 connects each base station apparatus to 402 to communication networks such as a core network.

The cover area 600 of the first base station apparatus 300 and the cover areas 610 to 612 of the third base station apparatus 400 to the fifth base station apparatus 402 have overlapping area. The cover areas 610 and 612 of the third base station apparatus 400 and the fifth base station apparatus 402 are positioned at the end of the cover area 600 of the first base station apparatus 300. The cover areas 611 of the fourth base station apparatus 401 is positioned other than at the end of the cover area 600 of the first base station apparatus 300.

The first base station apparatus 10 and the second base station apparatus 20 may be, for example, macro-cell base station apparatuses, and the third base station apparatus 400 to the fifth base station apparatus 402 may be, for example, femtocell base station apparatuses.

Figure 13:
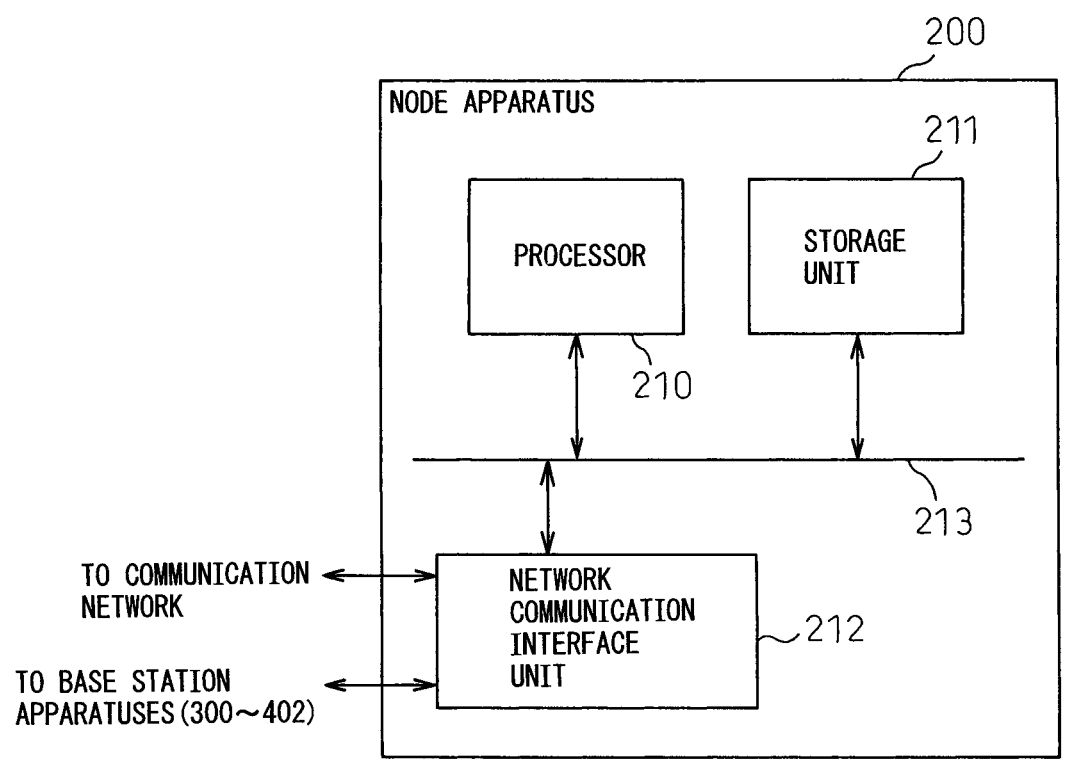
FIG. 13 is a view depicting an exemplary hardware construction of the node apparatus depicted in FIG. 12.

FIG. 13 is a view depicting the hardware construction of the node apparatus 200 depicted in FIG. 12. The node apparatus 200 includes a processor 210, a storage unit 211, a network communication interface 212, and a bus 213. The processor 210, the storage unit 211, and the network communication interface 212 are connected to the bus 213 for transmitting data.

Various computer programs and data for controlling the operation of the node apparatus 200 are stored in the storage unit 211. The storage unit 211 may include storage device such as a memory, and auxiliary storage unit such as a hard disk. The processor 210 is a known data processing apparatus, and executes the program stored in the storage unit 211, and executes various processing for controlling the operation of the node apparatus 200.

The network communication interface 212 executes the communication interface processing between the node apparatus 200 and the base station apparatuses 300 to 402. Also, the network communication interface 212 executes the communication interface processing between the node apparatus 200 and a communication network. The hardware construction as depicted in FIG. 13 is only an example of the hardware construction of the node apparatus 200. Various kinds of hardware construction can be employed for the node apparatus 200, as long as the processing as described below is executed.

Figure 14:
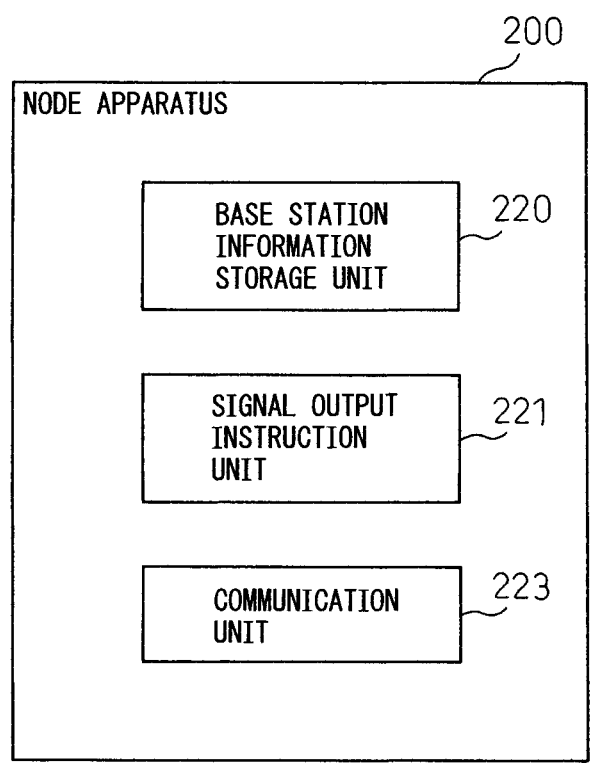
FIG. 14 is a view depicting an exemplary construction of the node apparatus depicted in FIG. 12.

FIG. 14 is a view depicting an exemplary construction of the node apparatus 200 depicted in FIG. 12. Function of each constituent depicted in FIG. 14 is realized by the processor executing the program stored in the storage unit 211. The drawing depicts mainly those functions related to the present exemplary embodiment.

The node apparatus 200 includes a base station information storage unit 220, a signal output instruction unit 221, and a communication unit 223. The communication unit 223 executes transmission and reception of signal between the node apparatus 200 and the base station apparatuses 300 to 402, and transmission and reception of signal between the node apparatus 200 between the node apparatus 200 and the communication network.

The base station information storage unit 220 executes storage processing of storing base station position information indicating the position of each base station apparatus received from the base station apparatus 300 to 402, and service area information indicating the cover area of each base station. The base station information storage unit 220 executes storage processing of storing radio output state information on radio outputting state of the base station apparatuses 300 to 402. The radio output state information is the information indicating whether or not the radio signal is being outputted or stopped in each base station apparatus. In the description that follows, the state in which radio signal is being outputted may be denoted as "ON state", and the state in which output of the radio signal is stopped may be denoted as "OFF state".

Figure 15:
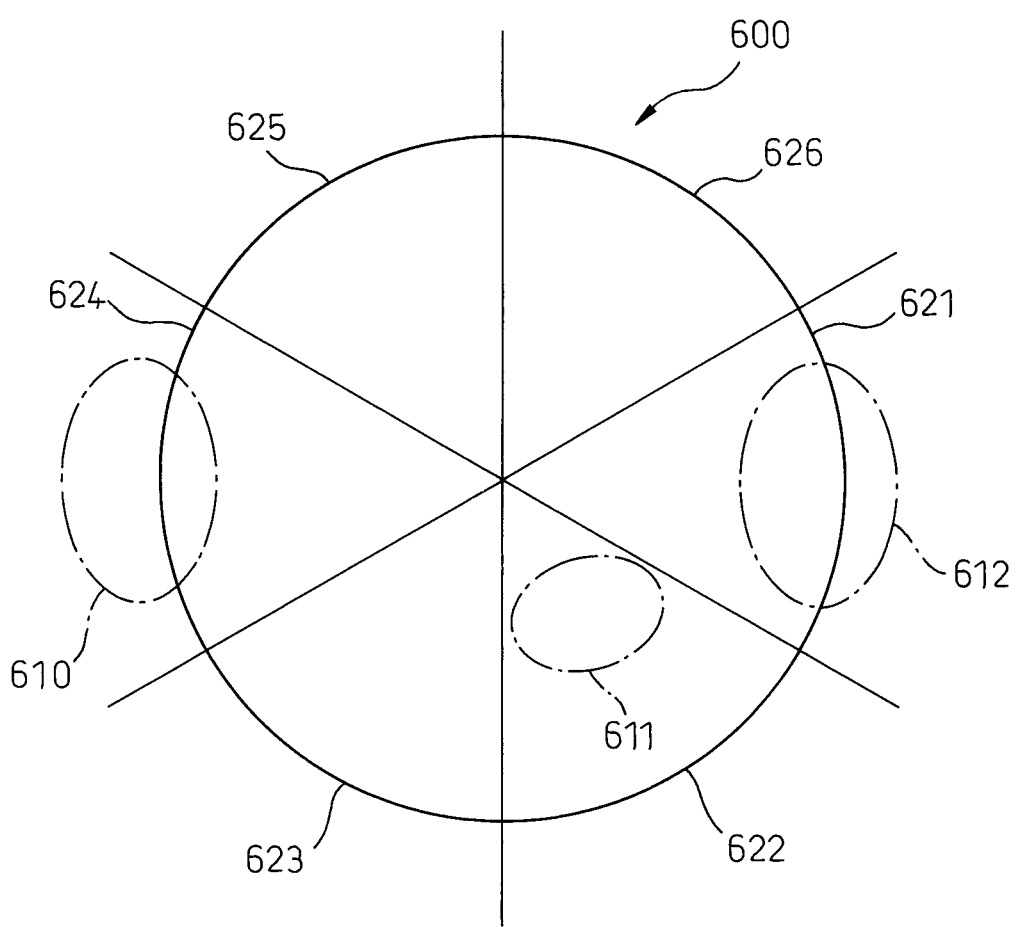
FIG. 15 is a view illustrating service area information.

FIG. 15 is a view illustrating the service area information. The service area information is information indicating the cover area of each base station apparatus. For example, the service area information may include coordinate information designating position of the cover area and shape information designating 2-dimensional shape of the cover area. The cover area 600 includes six cells 621 to 626, and is represented by 2-dimensional shape of six circular sectors. Also, cover areas 610 to 612 are represented by elliptical shape.

Referring to FIG. 14, the communication unit 223 transmits, to each base station apparatus, the base station position information on other base stations with cover area overlapping with the base station, and the service area information and the radio output state information.

Also, the communication unit 223 receives an instruction signal from the base station apparatus 300 for causing one of the third base station apparatus 401 to the fifth base station apparatus 402 to output the radio signal. In the description that follows, an instruction signal transmitted from the base station apparatus 300 for causing one of the third base station apparatus 401 to the fifth base station apparatus 402 to output the radio signal may be denoted as "ON request signal".

Upon reception of the ON request signal, the signal output instruction unit 221 transmits an instruction signal to the base station apparatus to which output of the radio signal is requested for causing radio signal to be outputted. In the description that follows, an instruction signal transmitted from the node apparatus for causing one of the third base station apparatus 401 to the fifth base station apparatus 402 to output the radio signal may be denoted as "ON instruction signal".

The communication unit 223 receives an OFF notice signal from one of the third base station apparatus 401 to the fifth base station apparatus 402 notifying that output of the radio signal is stopped. The signal output instruction unit 221 transmits radio output state information of the third base station apparatus 401 to the fifth base station apparatus 402 to the base station apparatus 300.

Figure 16:
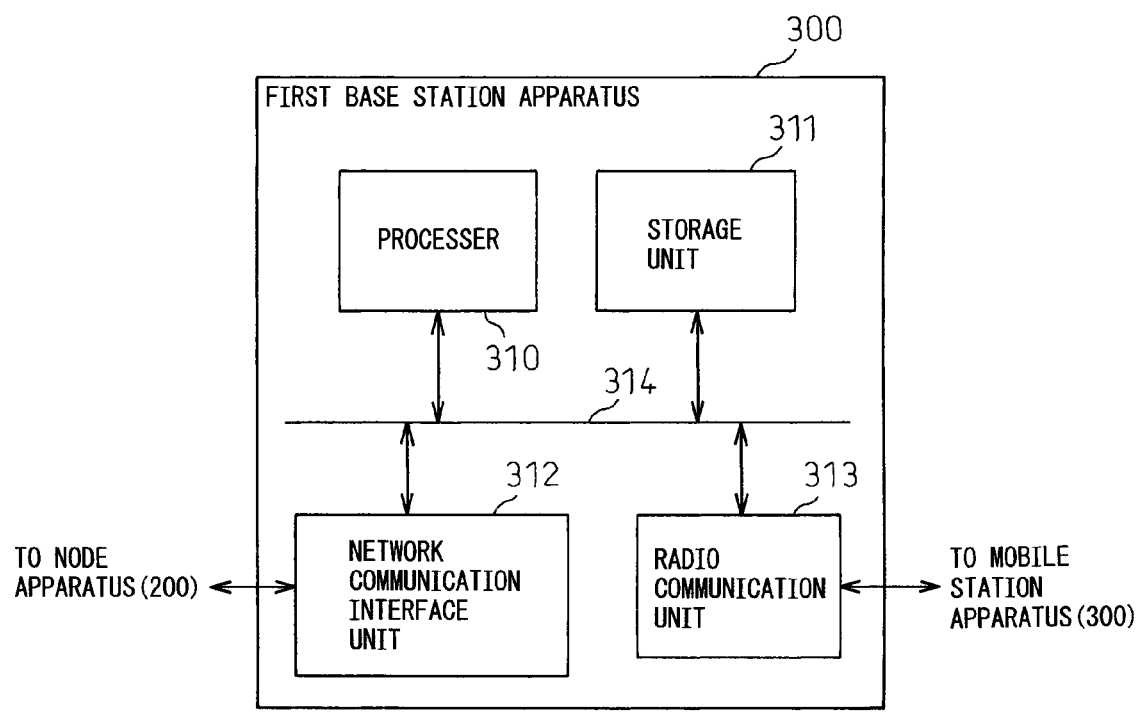
FIG. 16 is a view depicting an exemplary hardware construction of the first base station apparatus depicted in FIG. 12.

FIG. 16 is a view depicting an exemplary hardware construction of the first base station apparatus 300 depicted in FIG. 12. The second base station apparatus 301 has the same construction. The first base station apparatus 300 includes a processor 310, a storage unit 311, a network communication interface unit 312, a radio communication unit 313, and a bus 314. The processor 310, the storage unit 311, the network communication interface unit 312, and the radio communication unit 313 are connected to the bus 314 for transmitting data.

The storage unit 311 stores various computer programs and data for controlling the operation of the first base station apparatus 300. The storage unit 311 may include a storage device such as a memory or an auxiliary storage device such as a hard disk. The processor 310 is a known data processing apparatus, and executes the programs stored in the storage unit 311, and executes various processing for controlling the operation of the first base station 300.

The network communication interface unit 312 executes the communication interface processing between the node apparatus 200 and the first base station apparatus 300. The radio communication unit 313 executes radio communication processing between the first base station 300 and the mobile station 500. The hardware construction depicted in FIG. 16 is only an example of the hardware construction of the first base station 300. Various kinds of hardware constructions can be employed for the first base station 300 as long as the processing described below can be executed.

Figure 17:
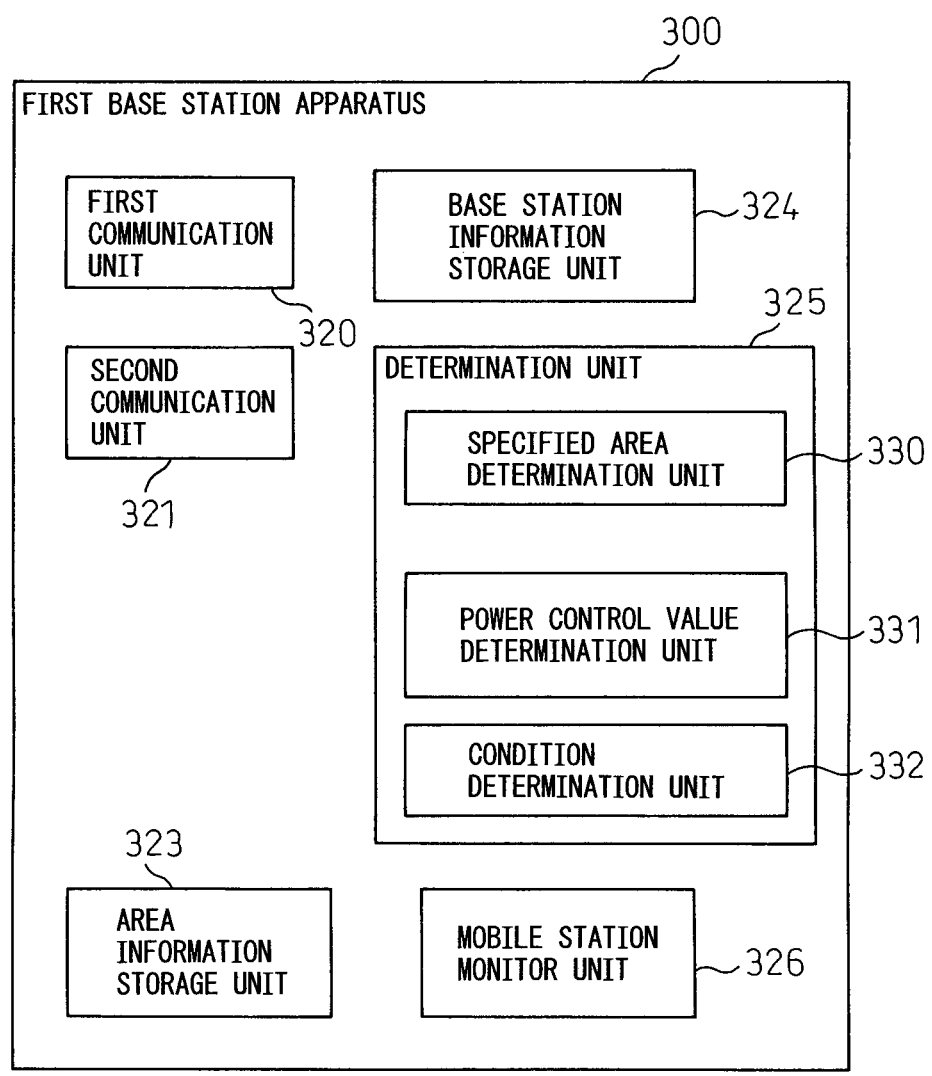
FIG. 17 is a view depicting an exemplary construction of the first base station apparatus depicted in FIG. 12.

FIG. 17 is a view depicting an exemplary construction of the first base station apparatus depicted in FIG. 12. The second base station apparatus 301 has the same construction. Functions of various constituents depicted in FIG. 17 are realized by the processor 310 executing the programs stored in the storage unit 311. The drawing depicts mainly those functions related to this exemplary embodiment.

The first base station 300 includes a first communication unit 320, a second communication unit 321, an area information storage unit 323, a base station information storage unit 324, a determination unit 325, and a mobile station monitor unit 326. The first communication unit 320 terminates signal transmitted and received in the communication between the mobile station 500 and the first base station 300. The second communication unit 321 controls the processing of transmission and reception of a control signal between the node apparatus 200 and the first base station 300.

The area information storage unit 323 stores the service area information of the first base station apparatus 300. The base station information storage unit 324 executes storage processing of storing the base station information, service area information, and radio output state information of another base station apparatus having cover area overlapping with the first base station apparatus 300. This information is transmitted from the node apparatus 200.

The determination unit 325 determines, for the third base station apparatus 400 to the fifth base station apparatus 402 concerning the mobile station apparatuses 500 positioned in respective specified areas, whether or not the prescribed first condition relating to number and respective power control values is satisfied.

The determination unit 325 includes a specified area determination unit 330, a power control value determination unit 331, and a condition determination unit 332. The specified area determination unit 330 determines respective specified area for each of the base station apparatuses 400 to 402, based on the service area information on the first base station apparatus 300 and the service area information of the base station apparatus 400 to 402. The specified area of the base station apparatus may be, for example, the overlapping area of the cover area 600 of the first base station apparatus 300 and the respective cover areas 610 to 612 of the base station apparatuses 400 to 402.

The power control value determination unit 331 determines the power control value for the mobile station apparatus 500 positioned in the cover area 600 of the first base station apparatus 300. The power control value for the mobile station apparatus 500 is the value for instructing output intensity of the radio signal in order to control the intensity of the radio signal outputted by the mobile station apparatus 500.

When the power for outputting uplink signal from the mobile station apparatus 500 is intense, the power for outputting downlink signal from the first base station apparatus 300 to the mobile station apparatus 500 becomes intense. When the power for outputting uplink signal from the mobile station apparatus 500 is weak, the power for outputting downlink signal from the first base station apparatus 300 to the mobile station apparatus 500 becomes weak. Therefore, the power control value determination unit 331 may use, for determination of the prescribed first condition, for example, the power control value instructing the output intensity for transmitting downlink signal from the first base station apparatus 300 to each mobile station apparatus 500 as the power control value for the mobile station apparatus 500.

The condition determination unit 332 determines, for mobile station apparatuses 500 positioned in the specified area, whether or not the prescribed first condition relating to the number and respective power control values is satisfied. The prescribed first condition will be described later.

When the prescribed first condition is satisfied in the specified area of one of the third base station apparatus 400 to the fifth base station apparatus 402, the second communication unit 321 transmits an ON request signal for causing radio signal to be outputted to the base station apparatus.

The mobile station monitor unit 326 receives position information from the mobile station apparatuses 500 positioned in the cover area 600 of the first base station apparatus 300, and monitors the position of the mobile station apparatuses 500.

Figure 18:
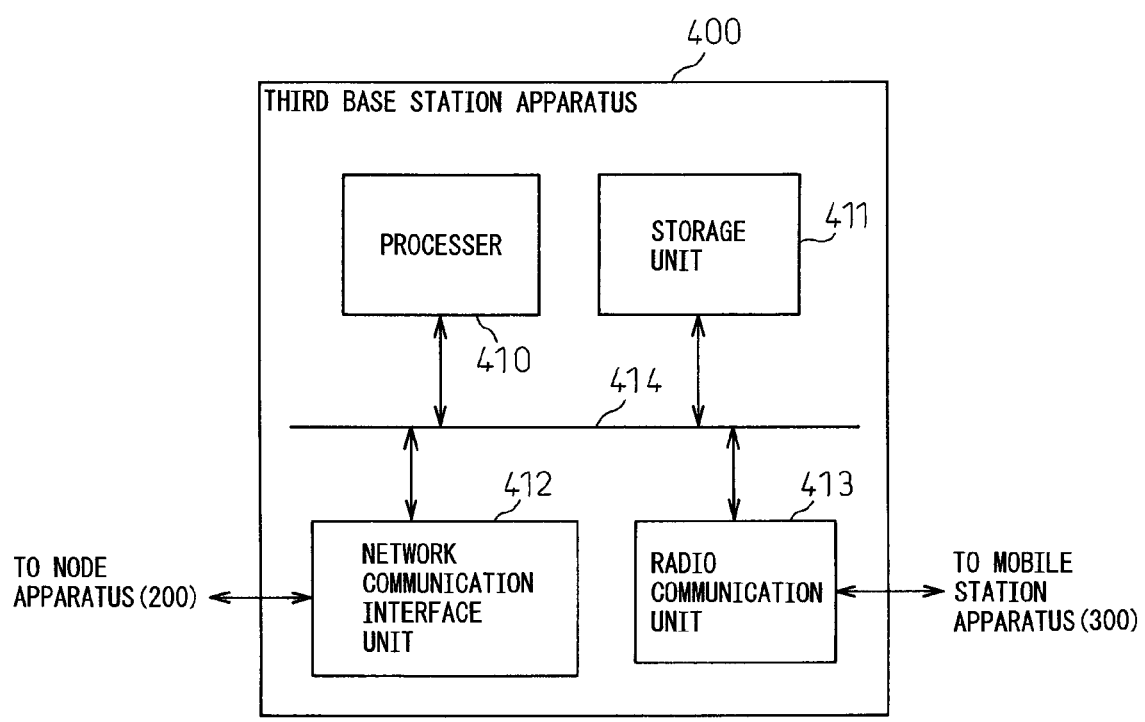
FIG. 18 is a view depicting an exemplary hardware construction of the third base station apparatus depicted in FIG. 12.

FIG. 18 is a view depicting an exemplary hardware construction of the third base station apparatus 400 depicted in FIG. 12. The fourth base station apparatus 401 and the fifth base station apparatus 402 have the same construction. The third base station apparatus 400 includes a processor 410, a storage unit 411, a network communication interface unit 412, a radio communication unit 413, and a bus 414. The processor 410, the storage unit 411, the network communication interface unit 412 and the radio communication unit 413 are connected to the bus 414 for transmitting data.

The storage unit 411 stores various computer programs and data for controlling the operation of the third base station apparatus 400. The storage unit 411 may include a storage device such as a memory, and an auxiliary storage device such as a hard disk. The processor 410 is a known data processing apparatus, and executes the programs stored in the storage unit 411, and executes various processing for controlling the operation of the third base station apparatus 400.

The network communication interface 412 executes communication interface processing between the node apparatus 400 and the third base station apparatus 400. The radio communication unit 413 executes radio communication processing between the third base station apparatus 400 and the mobile station apparatuses 500. The hardware construction depicted in FIG. 16 is only an example of hardware construction of the third base station apparatus 400. Various kinds of hardware construction may be employed for the third base station apparatus 400 as long as the processing described below can be executed.

Figure 19:
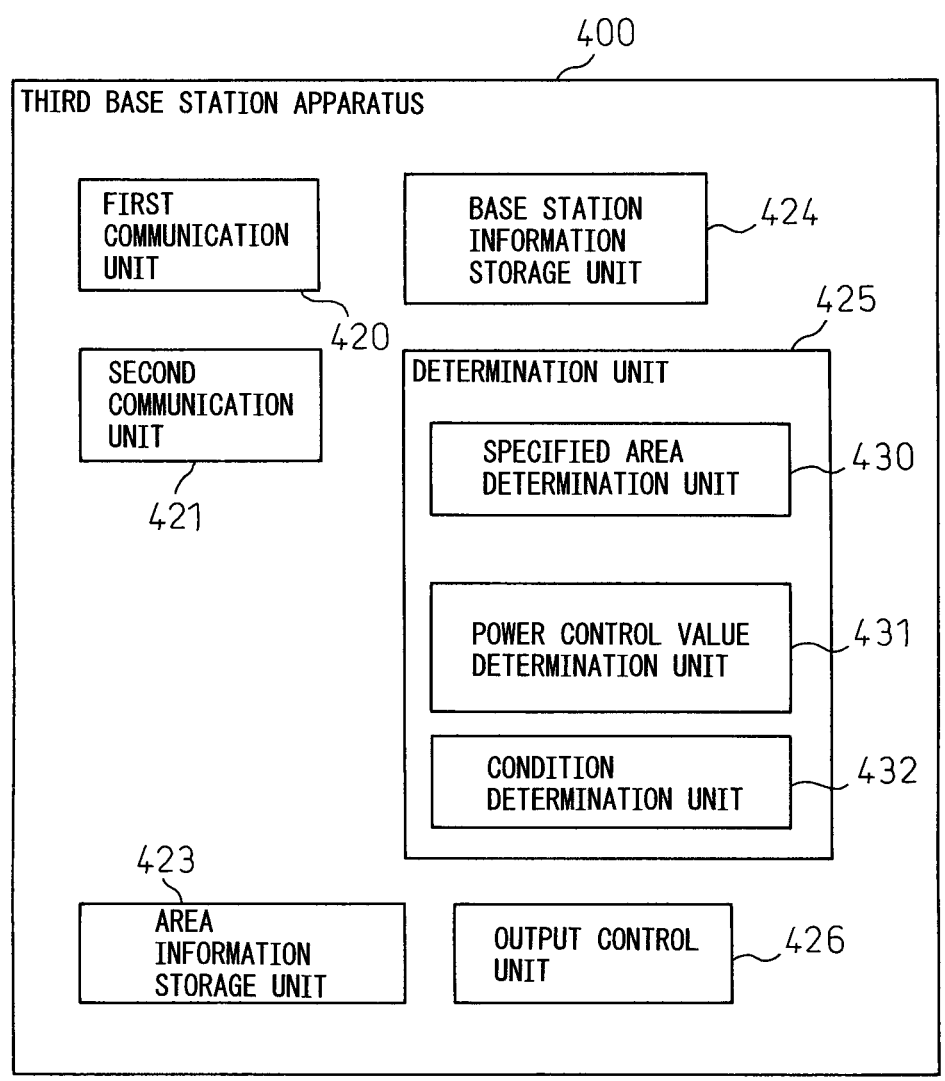
FIG. 19 is a view depicting an exemplary construction of the third base station apparatus depicted in FIG. 12.

FIG. 19 is a view depicting an exemplary construction of the third base station apparatus 400 depicted in FIG. 12. The fourth base station apparatus 401 and the fifth base station apparatus 402 have the same construction. Function of each of the constituents depicted in FIG. 19 is realized by the processor 410 executing the programs stored in the storage unit 411. The drawing depicts mainly the functions related to this exemplary embodiment.

The third base station apparatus 400 includes a first communication unit 420, a second communication unit 421, an area information storage unit 423, a base station information storage unit 424, a determination unit 425, and an output control unit 426. The first communication unit 420 terminates the signal transmitted and received in the communication between the mobile station apparatuses 500 and the third base station apparatus 400. The second communication apparatus 421 controls the transmission and reception processing of control signal between the node apparatus 200 and the third base station apparatus 400.

The area information storage unit 423 stores the service area information of the third base station apparatus 400. The base station information storage unit 424 executes storage processing of the base station position information, the service area information and the radio output state information on the first base station 300 that is the other base station having cover area overlapping with the third base station apparatus 400. This information is transmitted from the node apparatus 200.

The determination unit 425 determines, on the mobile stations 500 positioned in the specified area, whether or not the prescribed second condition relating to the number and the respective power control values is satisfied. The determination unit 425 includes a specified area determination unit 430, a power control value determination unit 431, and a condition determination unit 432. The specified area determination unit 430 determines the specified area based on the service area information of the third base station apparatus 400 and the service area information of the first base station apparatus 300. The specified area may be the overlapping area of the cover area 610 of the third base station apparatus 400 and the cover area 600 of the first base station apparatus 300.

The power control value determination unit 431 determines the power control value of the mobile station apparatuses 500 positioned in the service area 610 of the third base station apparatus 400. The condition determination unit 432 determines, for the mobile station apparatuses 500 positioned in the specified area, whether or not the prescribed second condition relating to the number and respective power control values is satisfied.

When the prescribed second condition is satisfied, the output control unit 426 stops output of radio signal from the third base station apparatus 400. The output control unit 426 may gradually decrease output so as to ultimately stop output of radio signal. By gradually decreasing output, the mobile station apparatuses 500 can be connected to the third base station apparatus 400 until handover to other base station apparatus has been completed, so that degradation of communication quality due to abrupt stop can be prevented. When the prescribed second condition is satisfied, the second communication unit 421 transmits an OFF notice signal to the node apparatus 200.

The second communication unit 421 receives an ON instruction signal from the node apparatus 200. When the ON instruction signal is received, the output control unit 426 starts outputting of radio signal from the third base station apparatus 400.

Figure 20:
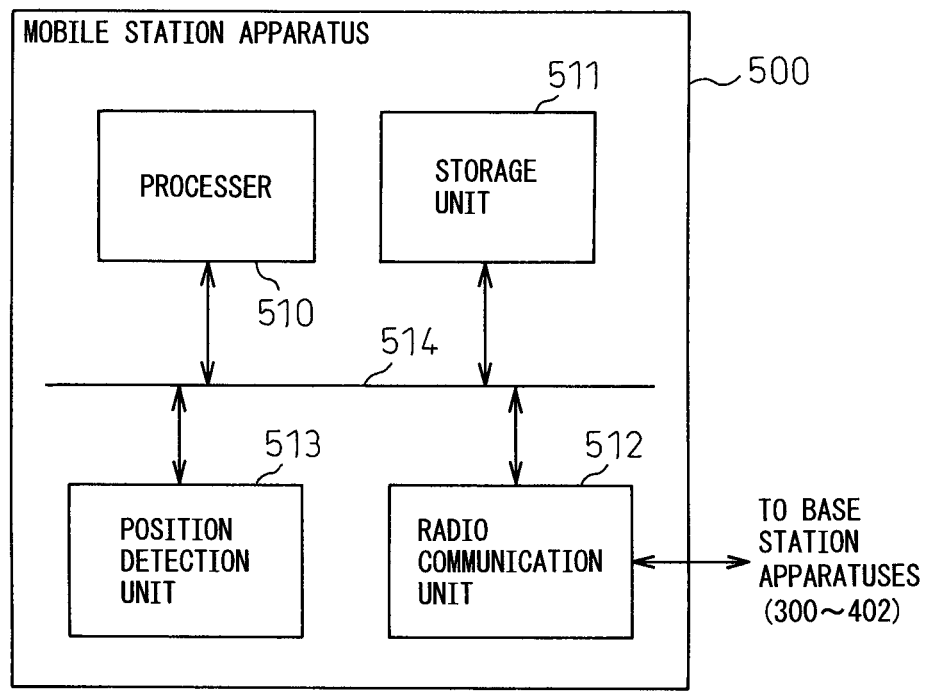
FIG. 20 is a view depicting an exemplary hardware construction of the mobile station apparatus depicted in FIG. 12.

FIG. 20 is a view depicting an exemplary hardware construction of the mobile station apparatus 500 depicted in FIG. 12. The mobile station apparatus 500 includes a processor 510, a storage unit 511, a radio communication unit 512, a position detection unit 513, and a bus 514. The processor 510, the storage unit 511, and the position detection unit 513 are connected to the bus 514 for transmitting data.

The storage unit 511 stores various computer programs and data for controlling the operation of the mobile station apparatus 500. The storage unit 511 may include a storage device such as a memory, and an auxiliary storage device such as a hard disk. The processor 510 is a known data processing apparatus, and executes the programs stored in the storage unit 511, and executes various processing for controlling the operation of the mobile station apparatus 500.

The radio communication unit 512 executes radio communication processing between the base station apparatuses 300 to 402 and the mobile station apparatuses 500. The position detection unit 513 detects the position of the mobile station apparatuses. The position detection unit 513 may use, for example, Global Positioning System (GPS) or Advanced Forward Link Trilateration (AFLT) to detect the position of the mobile station apparatuses 500. The hardware construction as depicted in FIG. 20 is only an example of the hardware construction of the mobile station apparatus 500. Various kinds of hardware construction can be employed for the mobile station apparatus 500, as long as the processing as described below can be executed.

Figure 21:
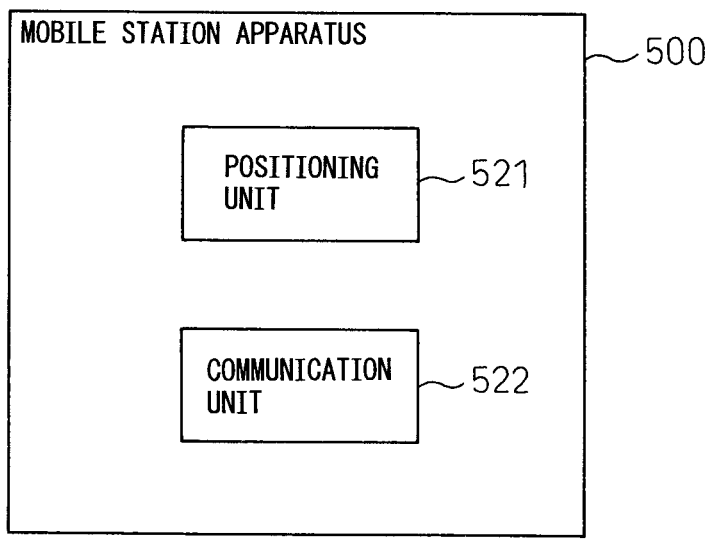
FIG. 21 is a view depicting an exemplary construction of the mobile station apparatus depicted in FIG. 12.

FIG. 21 is a view depicting an exemplary construction of the mobile station apparatus 500 depicted in FIG. 12. Function of each of the constituents depicted in FIG. 21 is realized by the processor 510 executing the programs stored in the storage unit 511. The drawing mainly depicts the function related to this exemplary embodiment.

The mobile station apparatus 500 includes a positioning unit 521 and a communication unit 522. The positioning unit 521 detects the position of the mobile station apparatus 500. The communication unit 522 terminates signal transmitted and received in the communication between the base station apparatuses 300 to 402 and the mobile station apparatus 500. The communication unit 522 transmits the position information indicating the position of the mobile station apparatus 500 measured by the positioning unit 521 to the first base station apparatus 300.

Figure 22:
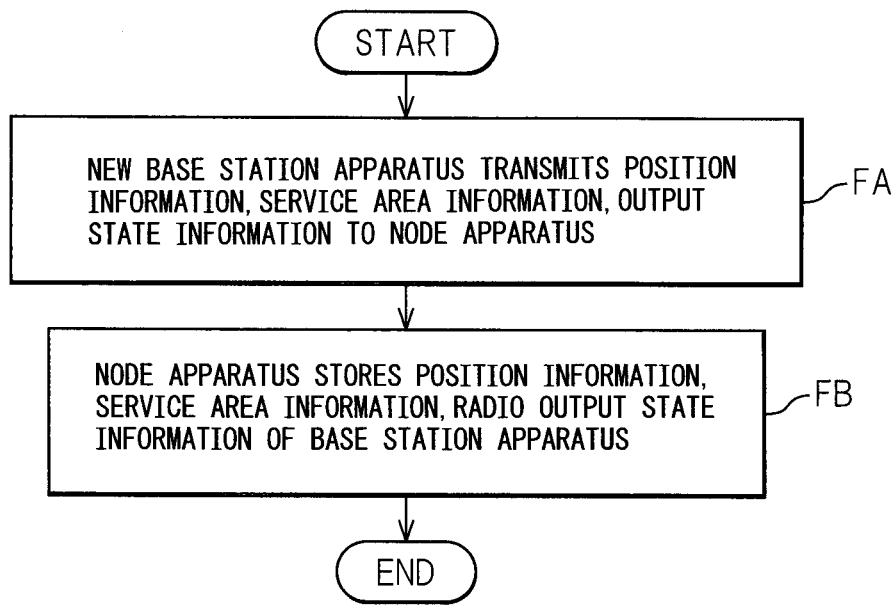
FIG. 22 is a view illustrating the processing performed when a new base station apparatus is provided.

Next, the processing executed in the communication system 100 will be described. FIG. 22 is a view illustrating the processing executed when a new base station is provided. In other embodiments, each of the following operations FA to FB may be a step. In operation FA, the second communication unit 321 or the second communication unit 421 transmits the base station position information, the service area information and the radio output state information of this base station apparatus to the node apparatus 200.

In operation FB, the communication unit 223 of the node apparatus 200 receives the base station position information, the service area information and the radio output state information transmitted from the newly provided base station apparatus. The base station information storage unit 220 executes storage processing of storing the received information.

FIG. 22 is a view illustrating the renewal processing of the information stored in the base station information storage unit 324. In other embodiments, each of the following operations GA to GB may be a step.

In operation GA, the communication unit 223 of the node apparatus 200 transmits to each of the base station apparatus 300 to 402 the base station position information, the service area information and the radio output state information of other base station apparatus having cover area overlapping with the respective base station apparatus. The node apparatus 200 may execute the operation GA in the timing of renewal of the base station information stored in the node apparatus 200, or may execute operation GA periodically.

In operation GB, the second communication unit 321 of the first base station apparatus 300 receives the base station position information, the service area information and the radio output state information of other base station apparatus transmitted from the node apparatus 200. The base station information storage unit 324 of the first base station apparatus 300 executes the processing of storing the received base station position information, the service area information and the radio output state information. The second communication unit 321 and the base station information storage unit 324 of the second base station apparatus 301, as well as the second communication unit 421 and the base station information storage unit 424 of the third base station apparatus 400 to the fifth base station apparatus 402 execute the same processing.

Figure 24:
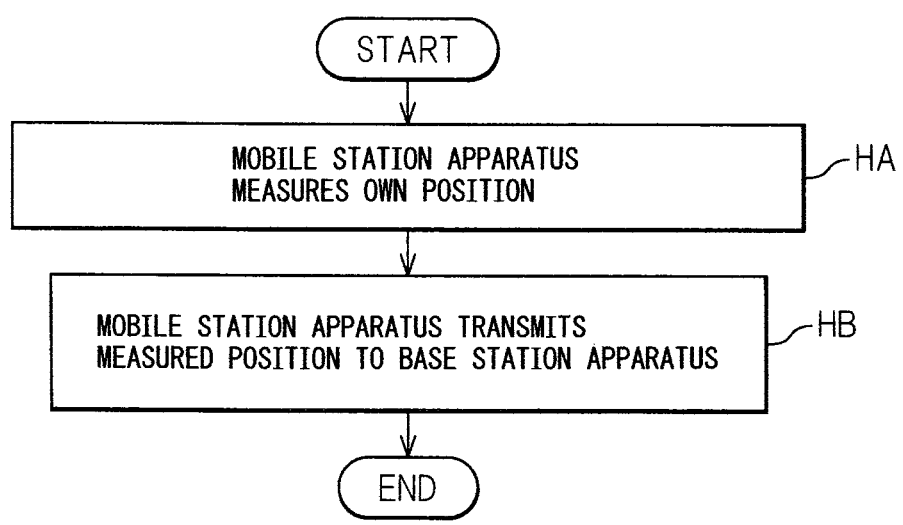
FIG. 24 is a view illustrating the monitor processing of the mobile station apparatus.

FIG. 24 is a view illustrating the monitor processing of the mobile station apparatus 500. In other embodiments, each of the following operations HA to HB may be a step. The mobile station apparatus 500 may execute operations HA to HB periodically. In operation HA, the positioning unit 521 of the mobile station apparatus 500 detects the position of the mobile station apparatus 500.

In operation HB, the communication unit 522 of the mobile station apparatus 500 transmits the position information indicating the measured position of the mobile station apparatus 500 to the first base station apparatus 300. The first communication unit 320 of the first base station apparatus 300 receives the position information transmitted from the mobile station apparatus 500. The mobile station monitor unit 326 of the first base station apparatus 300 executes the processing of storing the received position information.

In the processing of FIG. 24, the mobile station apparatus 500 transmits the position information spontaneously to the first base station apparatus 300. In addition to or in place of this, the first base station apparatus 300 may inquire to the mobile station apparatus 500 about the position information. The first base station apparatus 300 may periodically request the position information.

Figure 25:
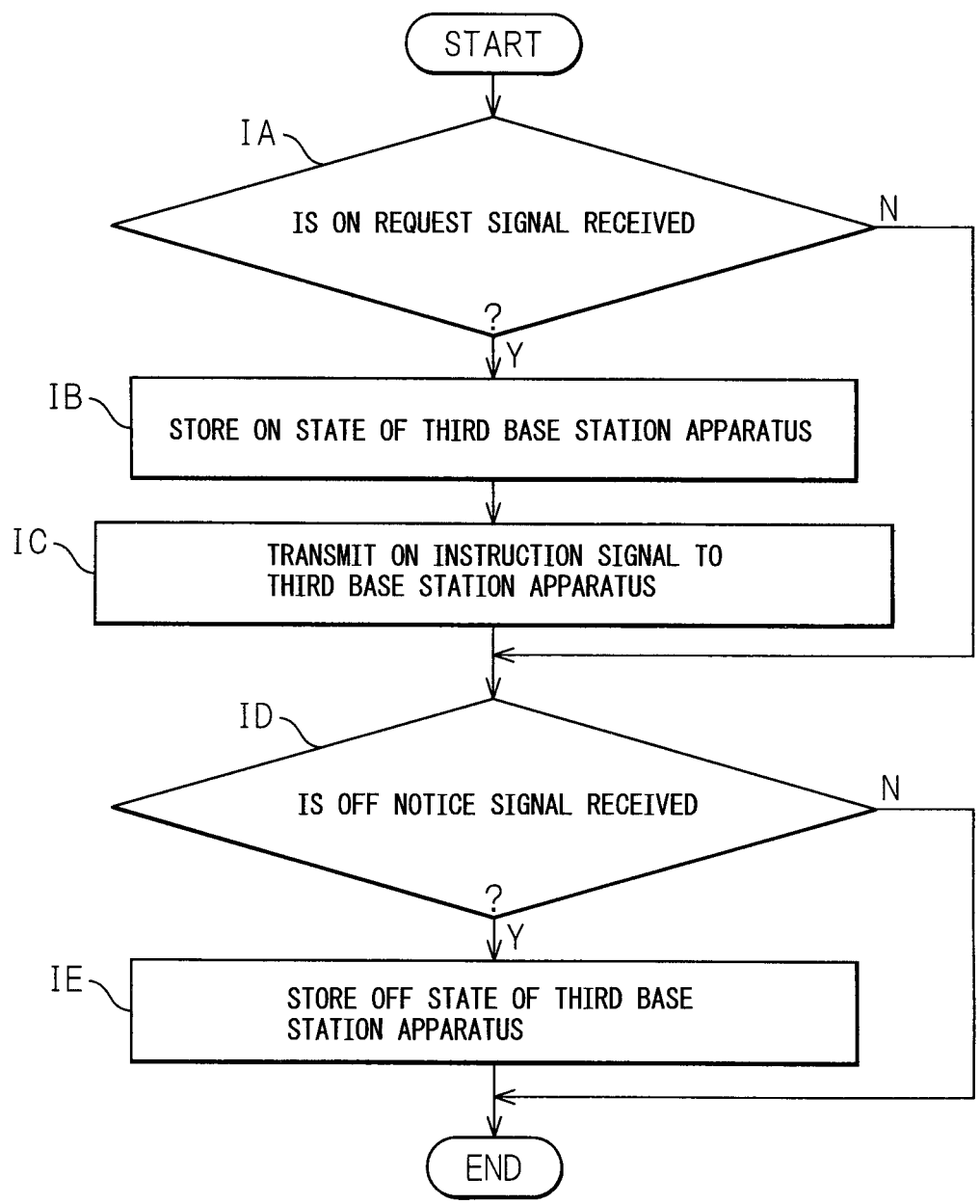
FIG. 25 is a view illustrating the processing of the node apparatus.

FIG. 25 is a view illustrating the processing executed by the node apparatus 200. In other embodiments, each of the following operations IA to IF may be a step. In operation IA, the communication unit 223 attempts to receive ON request signal from the first base station 300 or the second base station 301. If ON request signal is received (operation IA: Y), the processing proceeds to operation IB. If ON request signal is not received (operation IA: N), the processing proceeds to operation ID.

Figure 23:
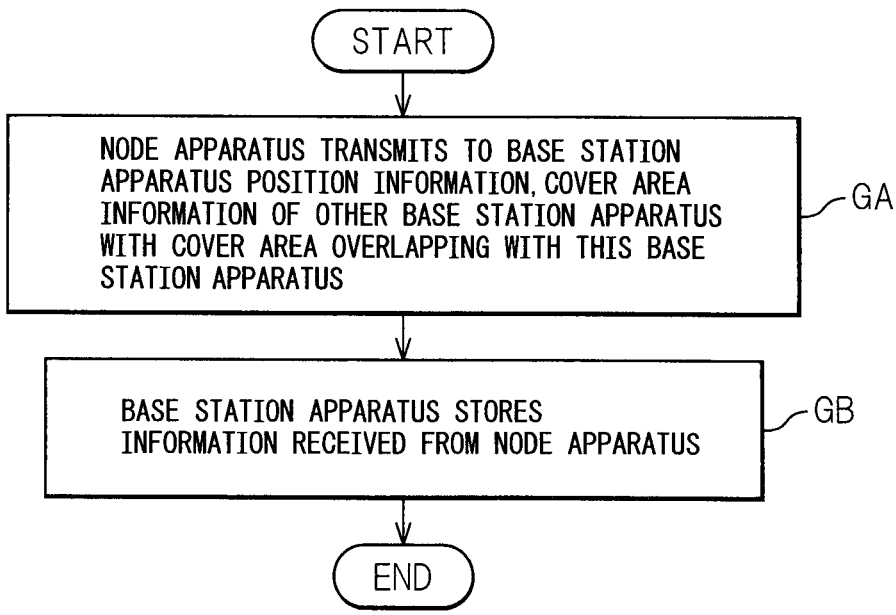
FIG. 23 is a view illustrating the renewal processing of information stored in the base station information storage unit.

The processing executed in operations IB and IC when ON request signal for causing the third base station apparatus 400 to output radio signal is received will be described below. In operation IB, the base station information storage unit 220 executes the processing of storing the ON state of the third base station apparatus 400. In operation IC, the signal output instruction unit 221 transmits ON instruction signal to the third base station apparatus 400. Operations IB and IC may be executed in arbitrary order. The state change of the third base station apparatus 400 is notified in operations GA and GB of FIG. 23 to the base station apparatuses other than the third base station apparatus 400.

In operation ID, the communication unit 223 attempts to receive OFF notice signal from the third base station apparatus 400 to the fifth base station apparatus 402. If OFF notice signal is received (operation ID: Y), the processing proceeds to operation IE. If OFF notice signal is not received (operation ID: N), the processing is terminated.

The processing executed in operations IB and IC when OFF notice signal is received from the third base station apparatus 400 will be described below. In operation IE, the base station information storage unit 220 executes the processing for storing OFF state of the third base station apparatus 400. The change of state of the third base station apparatus 400 is notified in operations GA and GB of FIG. 23 to the base station apparatuses other than the third base station apparatus 400.

Figure 26:
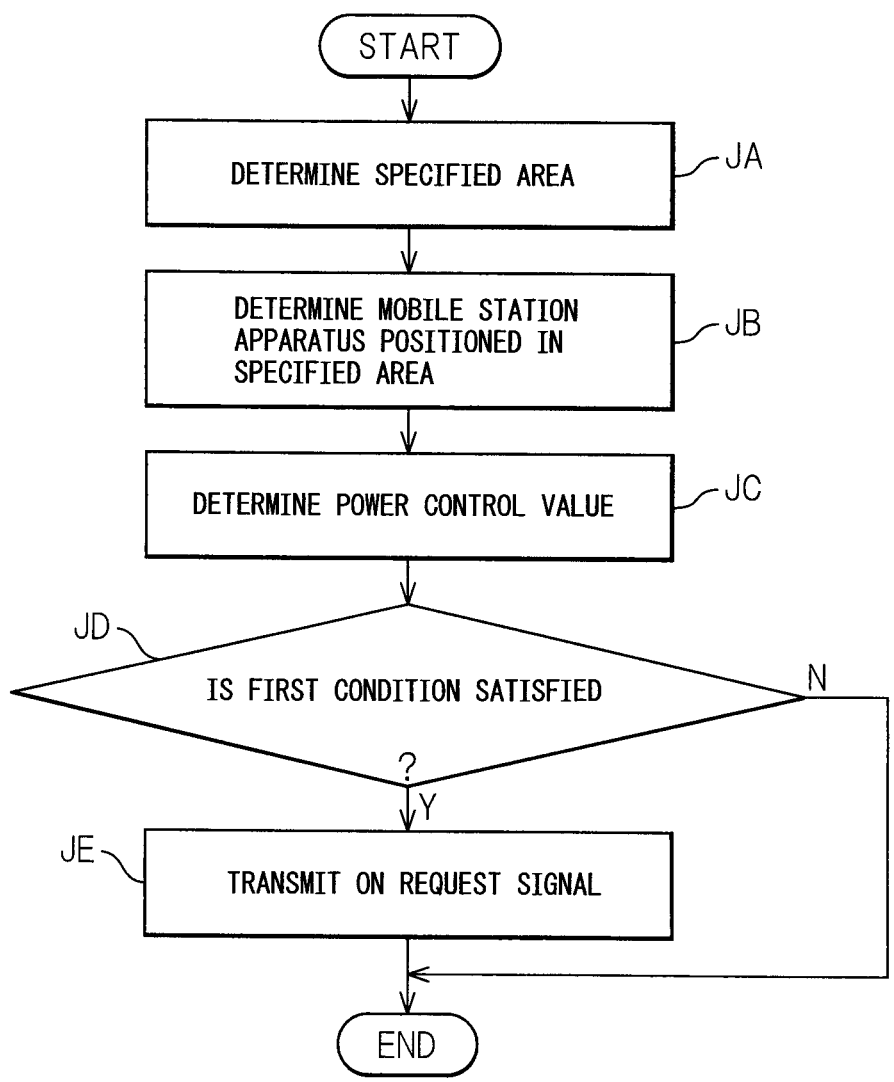
FIG. 26 is a view (1) illustrating the processing in the first base station apparatus.

FIG. 26 is a view (1) illustrating the processing executed in the first base station apparatus 300. Same processing is executed in the second base station apparatus 301. In other embodiments, each of the following operations JA to JE may be a step. In operation JA, the specified area determination unit 330 determines the specified area of the third base station apparatus 400.

In operation JB, the determination unit 324 determines the mobile station apparatuses positioned in the specified area. In operation JC, the power control value determination unit 331 determines the power control value for the mobile station apparatus 500 positioned in the cover area 600 of the first base station apparatus 300. Operation JC may be executed before operations JA and JB. Operation JC may be executed after operations JA and JB, and the power control value determination unit 331 may determines power control value for the mobile station apparatus 500 positioned in the specified area.

In operation JD, the condition determination unit 332 determines, for the mobile station apparatus 500 positioned in the specified area, whether or not the prescribed first condition relating to the number and respective power control values is satisfied.

Figure 27:
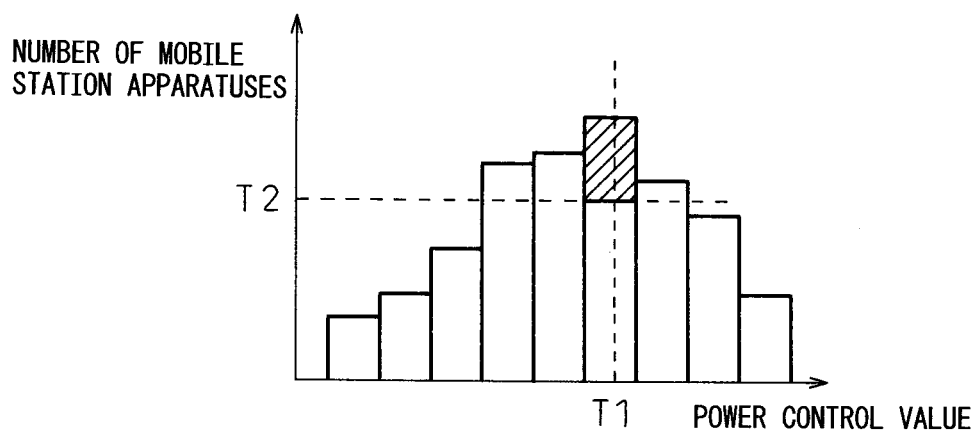
FIG. 27 is a view illustrating a first example of the first condition.

The prescribed first condition by which the condition determination unit 332 executes determination will be described. FIG. 27 is a view illustrating a first example of the first condition. The prescribed first condition may be a condition that is satisfied when the number of mobile station apparatuses which are positioned in the specified area and for which the intensity of radio signal to be outputted is designated by a prescribed power control value T1 exceeds a prescribed threshold T2.

Figure 28:
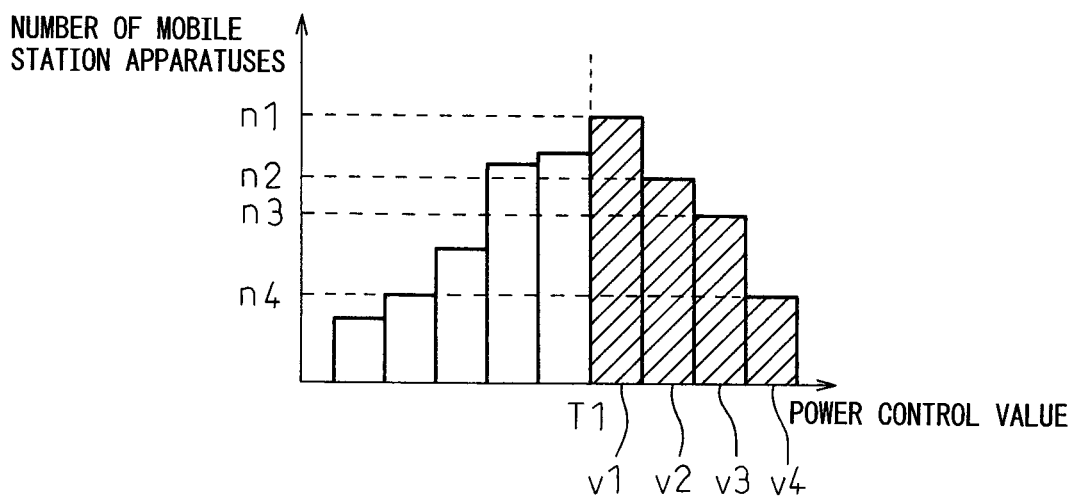
FIG. 28 is a view illustrating a second example of the first condition.

FIG. 28 is a view illustrating a second example of the first condition. Let the number of mobile station apparatuses which are positioned in the specified area and for which, for plural power control values v1 to v4 not lower than a prescribed first threshold T1, the intensity of the output signal is respectively designated by the power control values v1 to v4 be n1 to n4. The prescribed first condition is satisfied when the total sum of the number of the mobile station apparatuses n1 to n4 multiplied by respective power control values v1 to v4, that is, n1×v1+2×v2+ - - - +n4×v4, exceeds the prescribed second threshold T2.

Figure 29:
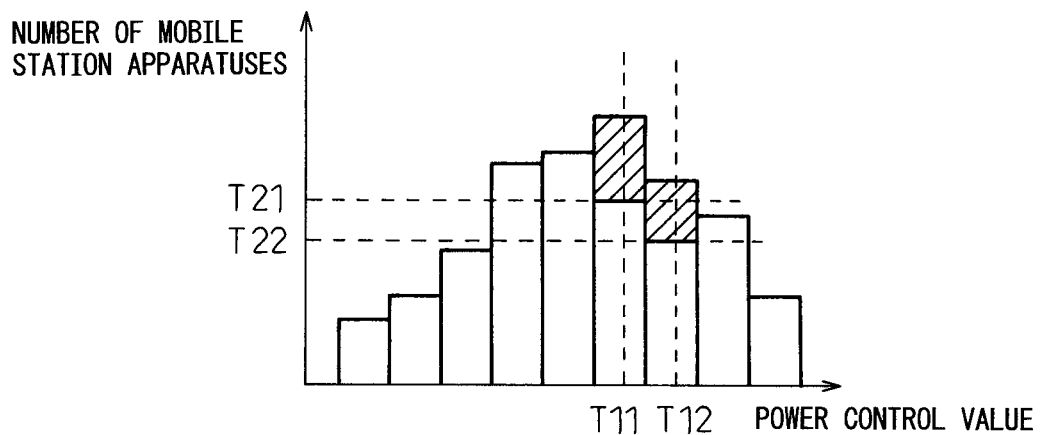
FIG. 29 is a view illustrating a third example of the first condition.

FIG. 29 is a view illustrating a third example of the first condition. The first condition depicted in FIG. 29 is a condition which is obtained by defining plural first conditions as depicted in FIG. 27 respectively for plural power control values and then combining these plural conditions in logical product and/or logical sum. For example, let condition A be that the number of mobile station apparatuses which are positioned in the specified area and for which intensity of radio signal to be outputted is designated by the prescribed power control value T11 exceeds a prescribed threshold T21. Also, let condition B be that the number of mobile station apparatuses which are positioned in the specified area and for which intensity of the radio signal to be outputted is designated by the prescribed power control value T12 exceeds a prescribed threshold T22. The prescribed first condition may be a condition that is satisfied when both condition A and the condition B are satisfied.

Referring to FIG. 26, if the prescribed first condition is satisfied (operation JD: Y), the processing proceeds to operation JE. If the prescribed first condition is not satisfied (operation JD: N), the processing is terminated.

For the third base station apparatus 400, in the case where the prescribed first condition is satisfied, the processing in operation JE will be described. In operation JE, the second communication unit 321 transmits ON request signal to cause the third base station apparatus 400 to output radio signal.

Figure 30:
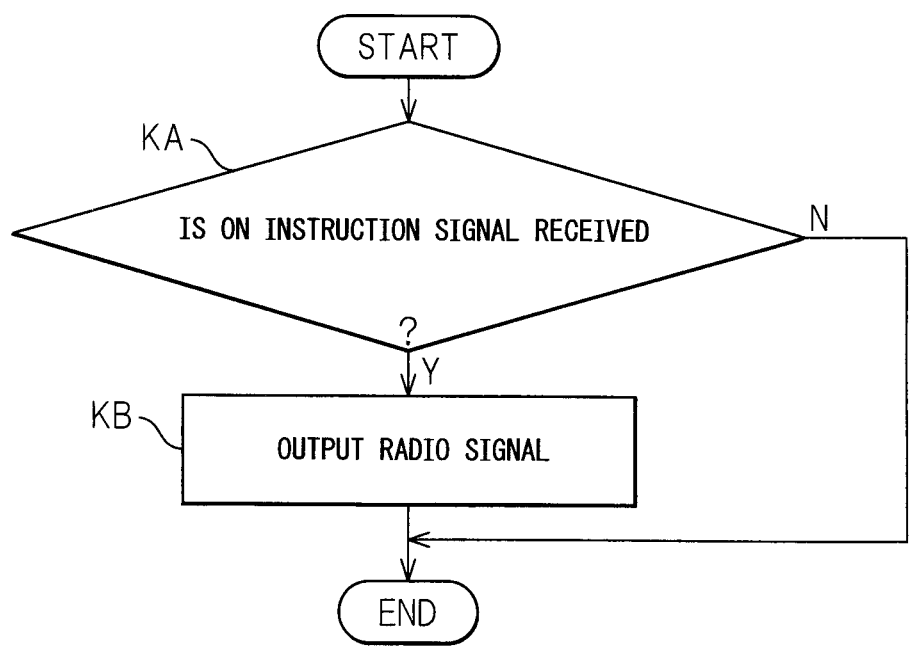
FIG. 30 is a view (1) illustrating the processing in the third base station apparatus.

FIG. 30 is a view (1) illustrating the processing in the third base station apparatus 400. Same processing is executed also in the fourth base station apparatus 401 and the fifth base station apparatus 402. In other embodiment, each of the following operations KA to KB may be a step. In operation KA, the second communication unit 421 attempts to receive ON instruction signal.

When ON instruction signal is received (operation KA: Y), the processing proceeds to operation KB. When ON instruction signal is not received (operation KA: N), the processing is terminated. In operation KB, the output control unit 426 starts to output radio signal from the third base station apparatus 400.

Figure 31:
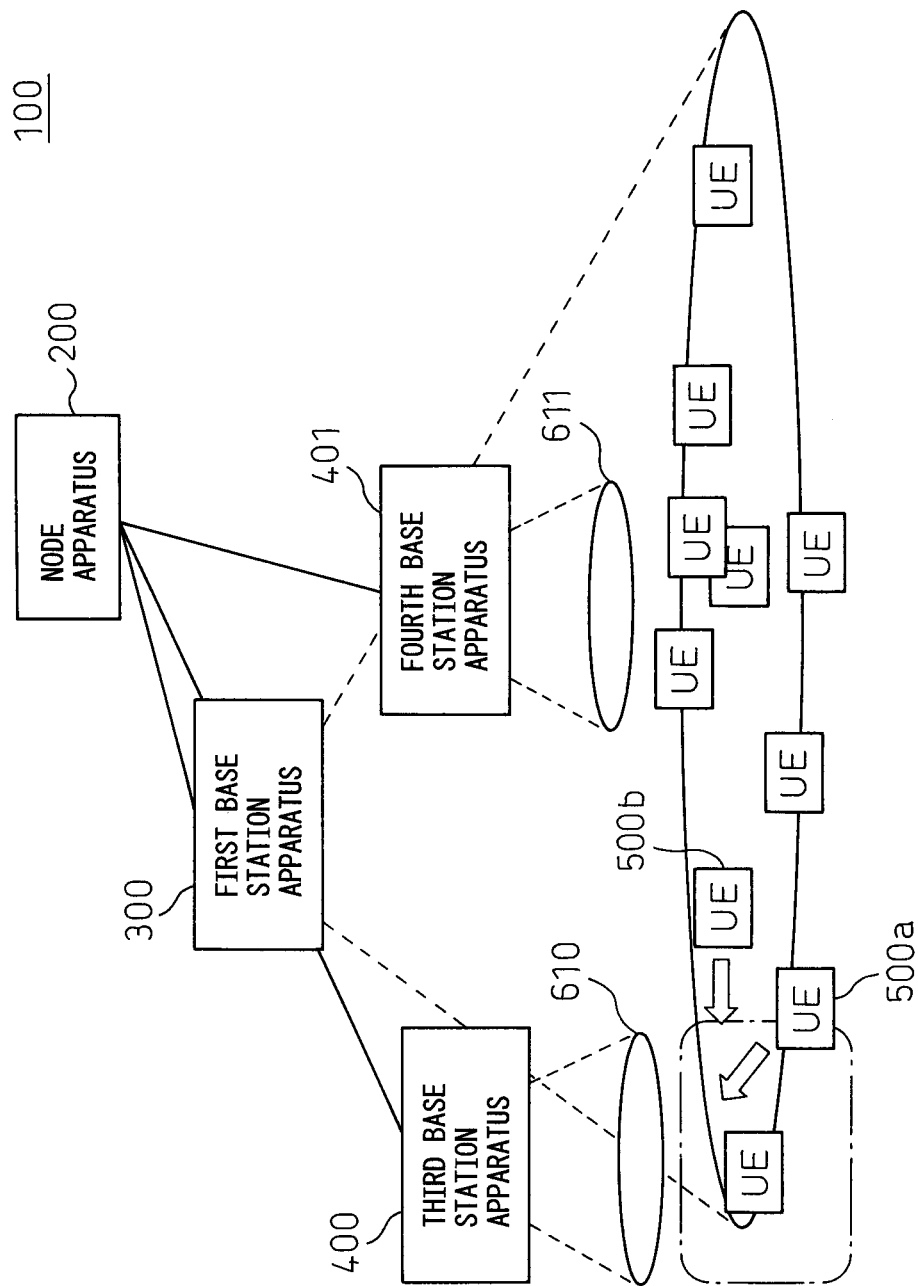
FIG. 31 is a view (1) illustrating the method of controlling the base station apparatuses.

FIG. 31 is a view (1) illustrating the method for controlling the base station apparatus. Here, a case is supposed where the third base station apparatus 400 having the cover area 610 overlapping at the end of the cover area 600 of the first base station apparatus 300 starts to output radio signal. As the specified area for the third base station apparatus 400, the overlapping area of the cover area 610 of the third base station apparatus 400 and the cover area 600 of the first base station apparatus 300 is used.

Suppose that the third base station apparatus 400 is in OFF state. If the mobile station apparatuses 500a and 500b positioned in the cover area 600 move to the end portion of the cover area 600, the power control value of radio output of the first base station apparatus 300 and the mobile station apparatuses 500a and 500b increase.

As a result, when the mobile station apparatuses 500a and 500b enter into the specified area, the number of mobile station apparatuses having large power control value in the specified area increases. By the increase of the number of the mobile station apparatuses having large power control value, the prescribed first condition is satisfied in operation JD depicted in FIG. 26, and the first base station apparatus 300 transmits ON request signal to the node apparatus 200 for causing the third base station apparatus 400 to output radio signal.

The node apparatus 200 that has received the ON request signal transmits ON instruction signal to the third base station 400. Upon receiving the ON instruction signal, the third base station apparatus 400 starts output of radio signal. When the third base station apparatus 400 starts output of the radio signal, the mobile station apparatus 500 positioned in the cover area 610 of the third base station apparatus 400 is handed-over from the cell of the first base station apparatus 300 to the cell of the third base station apparatus 400 for better quality of radio communication.

As a result, since output intensity of the radio signal of the mobile station apparatus 500 handed-over to the third base station apparatus 400 decreases, power consumption of the mobile station apparatus 500 is reduced. Also, since the mobile station apparatus 500 positioned in the end portion of the cover area of the first base station apparatus 300 is expelled to the cell of the third base station apparatus 400, the output intensity of the radio signal of the first base station apparatus 300 can be decreased so that power consumption of the first base station apparatus 300 is reduced.

Figure 32:
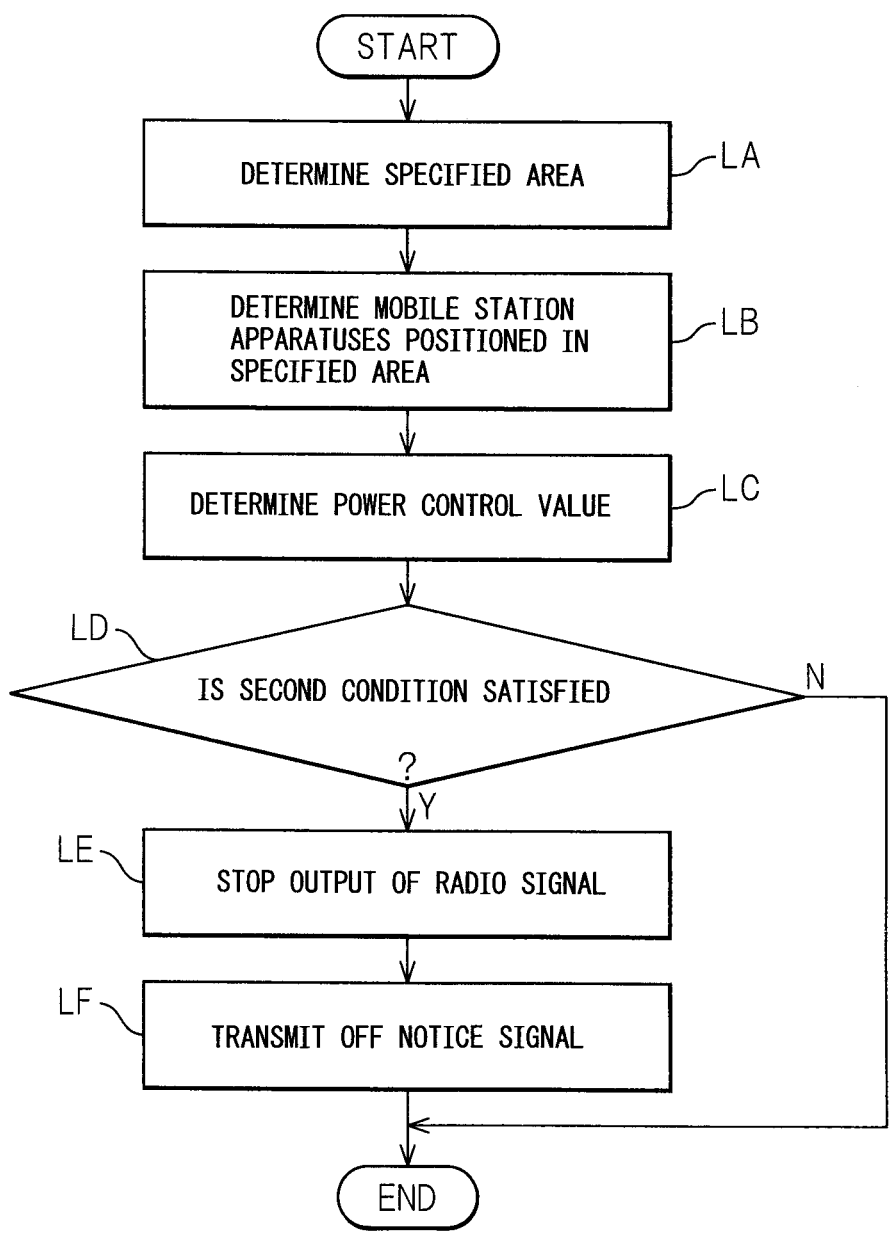
FIG. 32 is a view (2) illustrating the processing in the third base station apparatus.

Next, the processing in the case where output of the radio signal from the third base station apparatus 400 is stopped will be described. FIG. 32 is a view (2) illustrating the processing executed in the third base station apparatus 400. In other embodiment, each of the following operations LA to LF may be a step. In operation LA, the specified area determination unit 430 determines the specified area.

In operation LB, the determination unit 425 determines the mobile station apparatuses positioned in the specified area. The third base station apparatus 400 may acquire the position information of the mobile station apparatuses from the first base station apparatus 300. Alternatively, the third base station apparatus 400 may include same constituent as the mobile station monitor unit 326 of the first base station apparatus 300, and may acquire the position information from the mobile station apparatuses positioned in the cover area 610 of the third base station apparatus 400. In operation LC, the power control value determination unit 431 determines the power control value of the mobile station apparatus positioned in the cover area 610.

In operation LD, the condition determination unit 432 determines whether or not the prescribed second condition relating to the number of the mobile station apparatuses 500 positioned in the specified area and respective power control values is satisfied.

The prescribed second condition for the condition determination unit 432 to execute determination will be described below. The prescribed second condition may be a condition that is satisfied if the number of the mobile station apparatuses, which are positioned in the specified area and for which intensity of radio signal to be outputted, is instructed by a prescribed power control value T1 exceeds a prescribed threshold T2.

Figure 34:
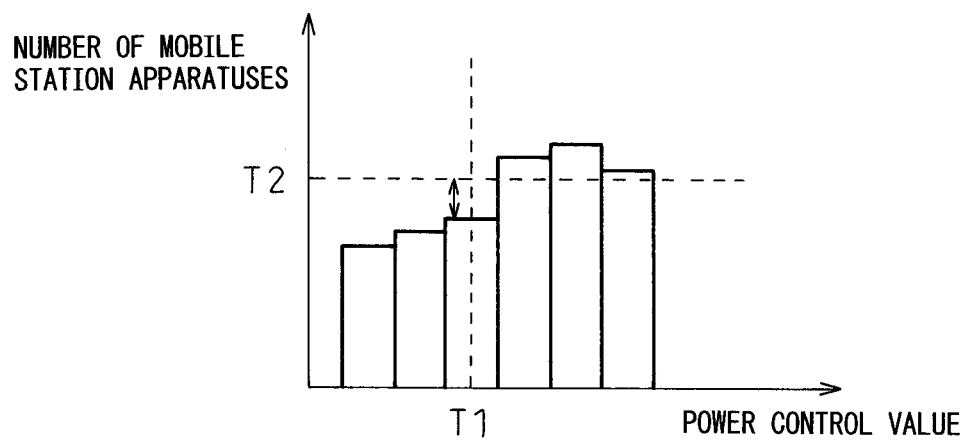
FIG. 34 is a view illustrating a second example of the second condition.

FIG. 34 is a view illustrating a second example of the second condition. The prescribed second condition may be a condition that is satisfied if the number of mobile station apparatuses which are positioned in the specified area and for which intensity of radio signal to be outputted is instructed by a prescribed power control value T1 is less than a prescribed threshold T2.

Figure 35:
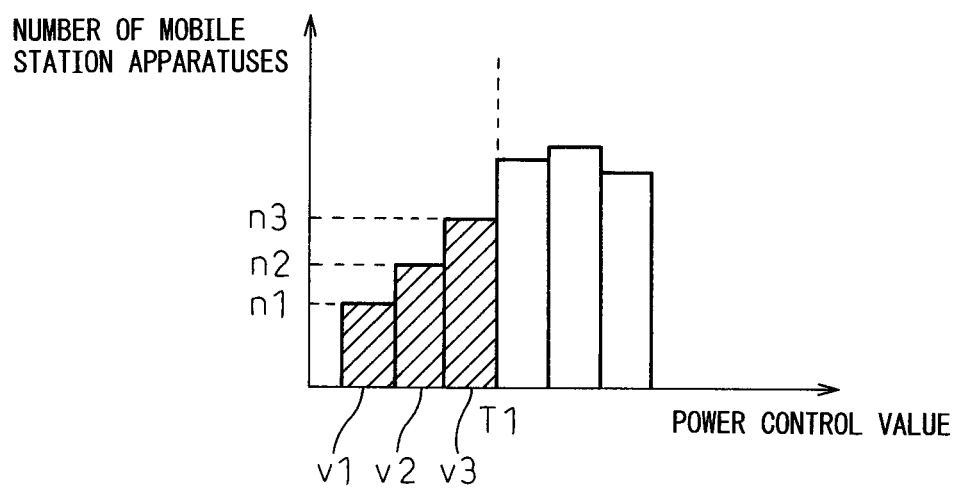
FIG. 35 is a view illustrating a third example of the second condition.

FIG. 35 is a view illustrating a third example of the second condition. Let the number of mobile station apparatuses which are positioned in the specified area and for which, with plural power control values v1 to v3 not greater than a prescribed first threshold T1, intensity of radio signal to be outputted is instructed by power control values v1 to v3 be n1 to n3. The prescribed second condition may be a condition that is satisfied if the sum of the number of mobile station apparatuses n1 to n3 multiplied by the respective power control values v1 to v3, that is, n1×v1+n2×v2+n3×v3, exceeds a prescribed second threshold T2.

Figure 33:
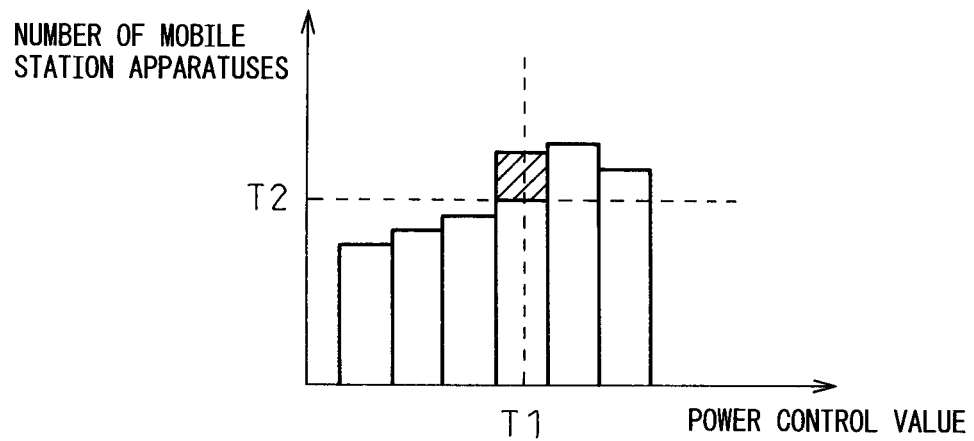
FIG. 33 is a view illustrating a first example of the second condition.
Figure 36:
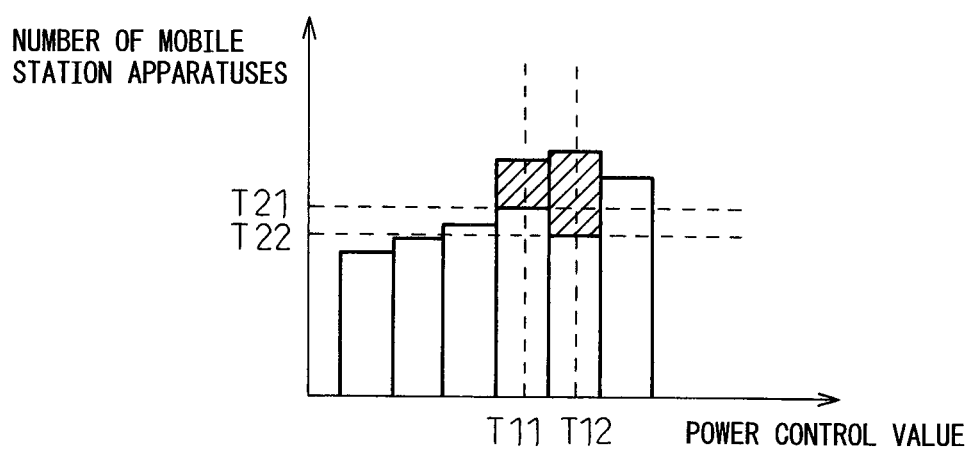
FIG. 36 is a view illustrating a fourth example of the second condition.

FIG. 36 is a view illustrating a fourth example of the second condition. The second condition depicted in FIG. 36 is a condition in which the second condition depicted in FIG. 33 is determined for each of plural power control values and these plural conditions are combined in logical product and/or logical sum. For example, let condition A be that the number of mobile station apparatuses which are positioned in specified area and for which intensity of radio signal to be outputted is instructed by a prescribed power control value T11 exceeds a prescribed threshold T21. Also, let condition B be that the number of mobile station apparatuses which are positioned in specified area and for which intensity of radio signal to be outputted is instructed by a prescribed power control value T12 exceeds a prescribed threshold T22. The prescribed second condition may be a condition that is satisfied when both condition A and condition B are satisfied.

Figure 37:
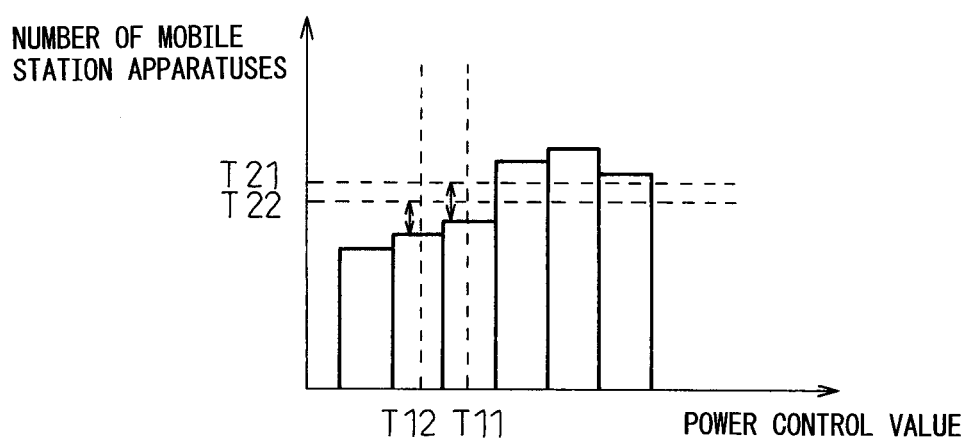
FIG. 37 is a view illustrating a fifth example of the second condition.

FIG. 37 is a view illustrating a fifth example of the second condition. The second condition depicted in FIG. 37 is a condition in which the second condition depicted in FIG. 34 is determined for each of plural power control values and these plural conditions are combined in logical product and/or logical sum. For example, let condition A be that the number of mobile station apparatuses which are positioned in the specified area and for which intensity of the radio signal is instructed by a prescribed power control value T11 is less than a prescribed threshold T21. Also, let condition B be that the number of mobile station apparatuses which are positioned in the specified area and for which intensity of the radio signal is instructed by a prescribed power control value T12 is less than a prescribed threshold T22. Then, the prescribed second condition may be a condition that is satisfied when both condition A and condition B are satisfied.

Further, it is also possible to define conditions depicted in FIG. 33 for one or more power control values and define conditions depicted in FIG. 34 for one or more power control values and to define the prescribed second condition by combining these conditions in logical product or logical sum.

Referring to FIG. 32, if the prescribed second condition is satisfied (operation LD: Y), the processing proceeds to operation LE. If the prescribed second condition is not satisfied (operation LD: N), the processing is terminated.

In operation LE, the output control unit 426 stops output of radio signal from the third base station apparatus 400. In operation LF, the second communication unit 421 transmits OFF notice signal to the node apparatus 200. Operations LE and LF may be executed in any order.

Figure 38:
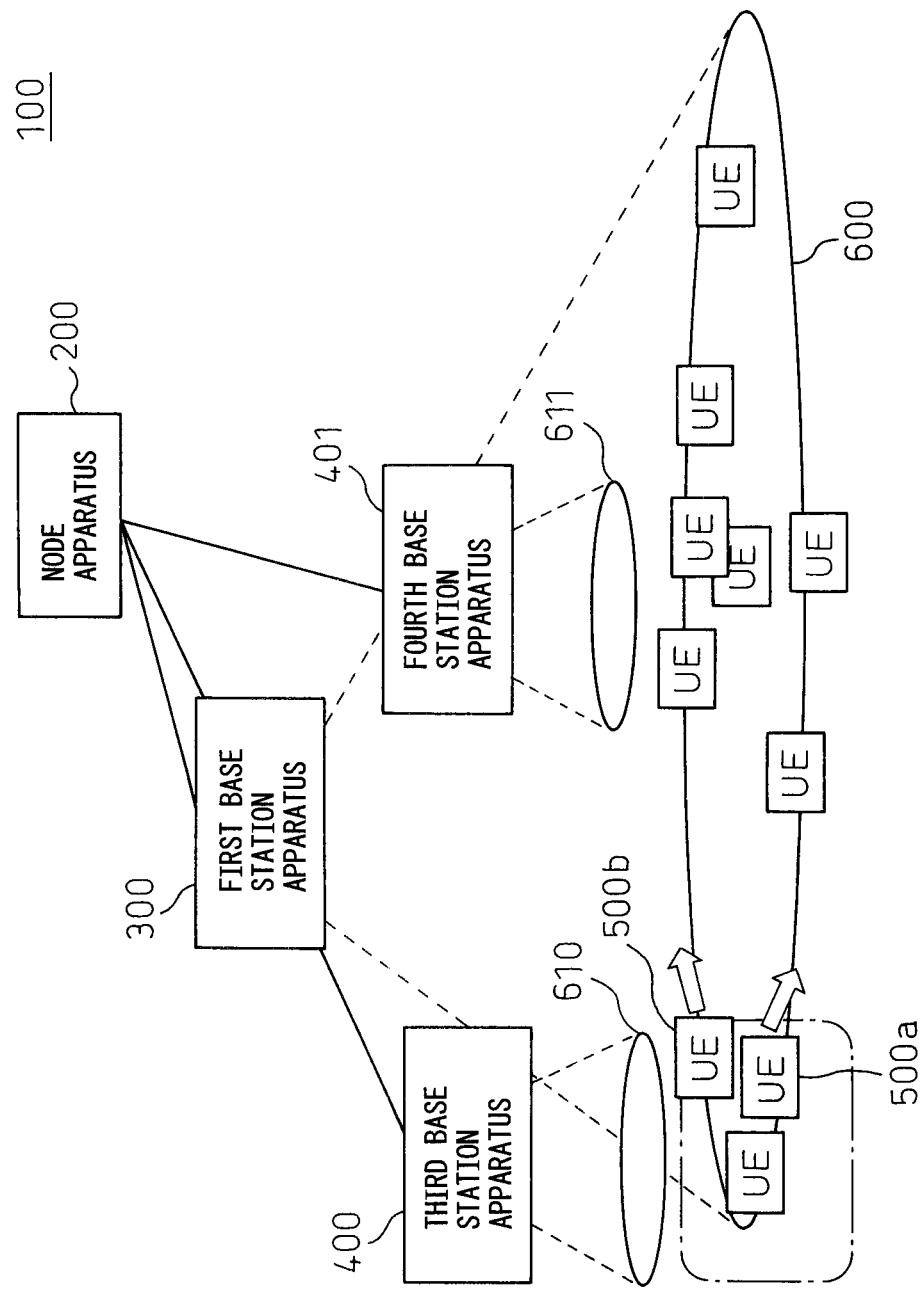
FIG. 38 is a view (2) illustrating the method of controlling the base station apparatuses.

FIG. 38 is a view (2) illustrating the method of controlling the base station apparatus. A case where the third base station apparatus 400 having the cover area 610 overlapping with the end portion of the cover area 600 of the first base station apparatus 300 stops radio output is considered. As specified area, the overlapping area of the cover area 610 of the third base station apparatus 400 and the cover area 600 of the first base station apparatus 300 is used.

Suppose that the third base station apparatus 400 is in the ON state. If the mobile station apparatuses 500a and 500b positioned in the cover area 610 of the third base station apparatus 400 move from the end portion of the cover area 600, the power control value of radio output of the third base station apparatus 400 and the mobile station apparatuses 500a and 500b increase.

As a result, in the specified area, the number of mobile station apparatuses having large power control value increases. If, in operation LD depicted in FIG. 32, the prescribed second condition is satisfied due to increase of mobile station apparatuses having large power control value, the third base station apparatus 400 stops output of radio signals. The third base station apparatus 400 transmits OFF notice signal to the node apparatus 200.

When the third base station apparatus 400 stops output of the radio signal, the mobile station apparatus 500 positioned in the cover area 610 of the third base station apparatus 400 is handed-over to the cell of the first base station apparatus 300. When the number of mobile station apparatuses positioned in the end portion of the cover area 600 decrease and large power saving cannot be expected from output of the radio wave by the third base station apparatus 400, output of the radio power of the third base station 400 is stopped to thereby decrease overall power consumption of entire communication system.

Figure 39:
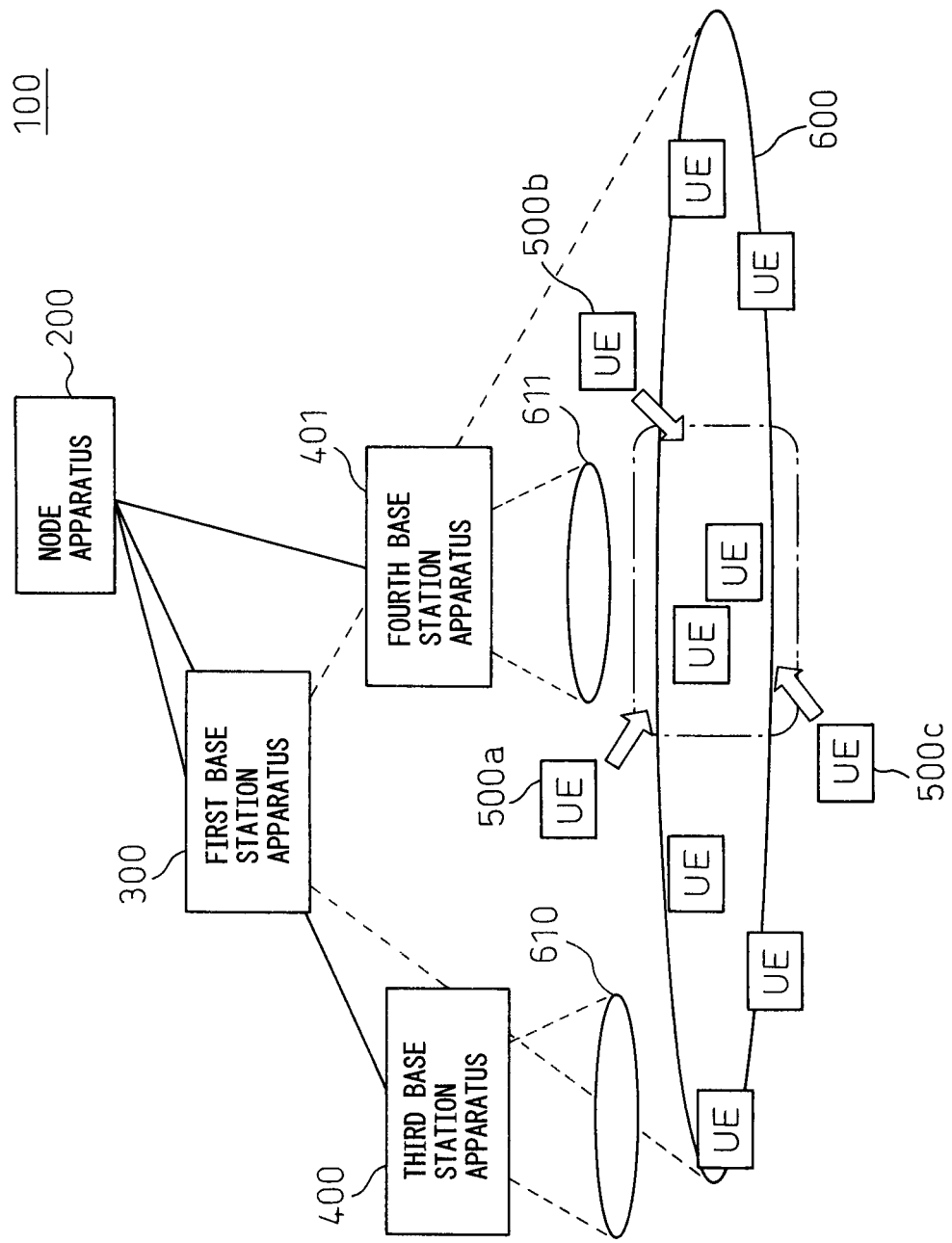
FIG. 39 is a view (3) illustrating the method of controlling the base station apparatuses.

FIG. 39 is a view (3) illustrating the method of controlling the base station apparatus. A case where the fourth base station apparatus 401 having the cover area 611 overlapping with the cover area 600 other than the end portion of the cover area 600 of the first base station apparatus 300 starts radio output is considered. Also, the case where the first base station apparatus 300 uses the overlapping area of the cover area 611 and the cover area 600 as the specified area defined for the fourth base station apparatus 401.

Suppose that the fourth base station apparatus 401 is in the OFF state. If the mobile station apparatuses 500a to 500c positioned in the cover area 600 move into cover area 611, and as a result, the mobile station apparatuses are concentrated in this area, communication quality is degraded due to interference. Thus, power control value of radio output of the first base station apparatus 300 and the mobile station apparatuses 500a to 500c increase. As a result, the number of mobile station apparatuses having large power control value increase.

The determination unit 325 of the first base station apparatus 300 executes the same processing as the processing described with reference to FIG. 26. When the number of mobile station apparatuses positioned in the specified area increases to a value not less than a threshold, the condition determination unit 332 may regard the power control value of these mobile station apparatuses as large due to the effect of the interference. Therefore, the condition determination unit 332 may determine, in place of above-described determination method, that the prescribed first condition is satisfied when the number of mobile station apparatuses positioned in the specified area is equal to or greater than a threshold.

When the prescribed first condition is satisfied, the first base station apparatus 300 transmits ON request signal to the node apparatus 200 for causing the fourth base station apparatus 401 to output radio signal. Upon receiving the ON request signal, the node apparatus 200 transmits ON instruction signal to the fourth base station apparatus 401. Upon receiving the ON instruction signal, the fourth base station apparatus 401 starts output of radio signal. When the fourth base station apparatus 401 starts output of the radio signal, the mobile station apparatus 500 positioned in the cover area 611 of the fourth base station apparatus 401 executes hand-over from the cell of the first base station apparatus 300 to the cell of the fourth base station apparatus 401 for better radio communication quality.

As a result, the output intensity of the radio signal of the mobile station apparatus 500 handed-over to the cell of the fourth base station apparatus 401 decreases, and power consumption of the mobile station apparatus 500 is reduced. Since the mobile station apparatus 500 which has given rise to radio wave interference in the cell of the first base station apparatus 300 is expelled to the cell of the fourth base station apparatus 401, output intensity of the radio signal of the first base station apparatus 300 can be reduced, and power consumption of the first base station apparatus can be reduced.

Figure 40:
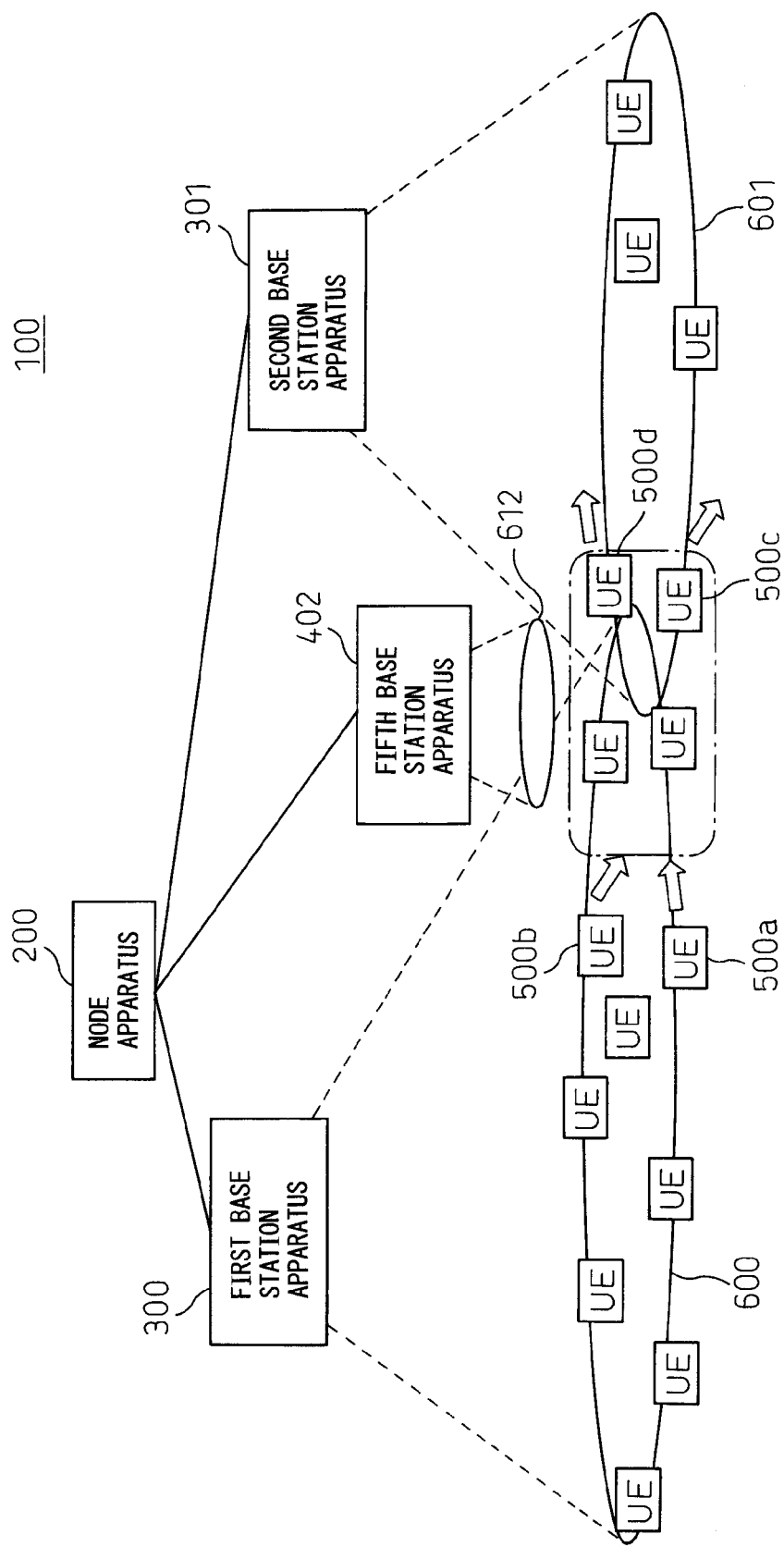
FIG. 40 is a view (4) illustrating the method of controlling the base station apparatuses.

Next, the processing for causing the base station apparatus to continue output of the radio signal and the processing in the case where this competes with the processing for stopping output will be described. FIG. 40 is a view (4) illustrating the method of controlling the base station apparatus. A case where the fifth base station apparatus 402 having cover area 612 overlapping with the cover area 600 at the end portion of the cover area 600 of the first base station apparatus 300 is outputting radio signal is considered. Also, the case where the first base station apparatus 300 uses the overlapping area of the cover area 612 and the cover area 600 as the specified area defined for the fifth base station apparatus 402 is considered.

Figure 41:
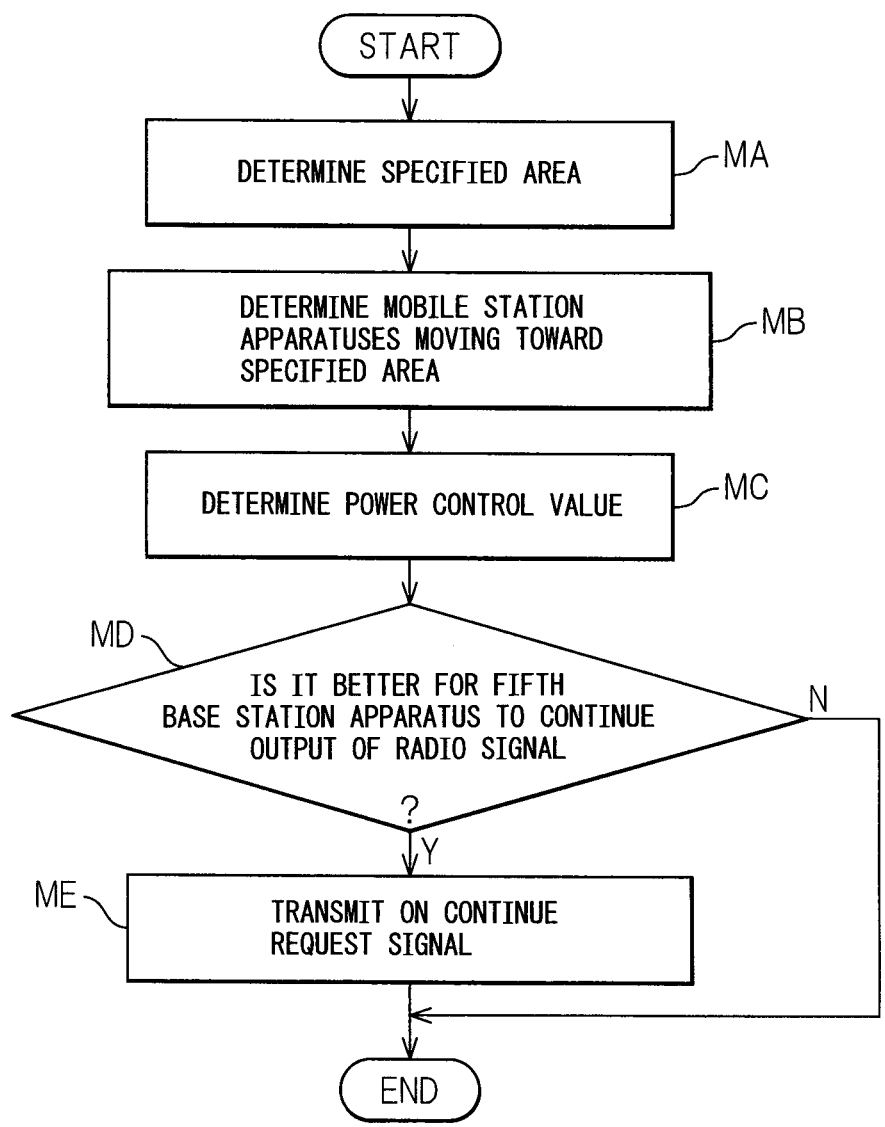
FIG. 41 is a view (2) illustrating the processing in the first base station apparatus.

FIG. 41 is a view (2) illustrating the processing executed in the first base station apparatus 300. In other embodiments, each of the following operations MA to ME may be a step. In operation MA, the specified area determination unit 330 determines the specified area for the fifth base station apparatus 402.

In operation MB, in operation JB, the determination unit 325 determines the mobile station apparatus moving toward the specified area. The determination unit 325 predicts the mobile station apparatuses positioned in the specified area in a prescribed time period based on the change of the position of the mobile station apparatuses being monitored by the mobile station monitor unit 326.

In operation MC, the power control value determination unit 331 determines the power control values for the mobile station apparatuses 500 positioned in the cover area 600 of the first base station apparatus 300. In operation MD, the condition determination unit 332 determines whether or not it is better for the fifth base station apparatus 402 to continue output of the radio signal.

For example, the condition determination unit 332 may determine for the mobile station apparatuses predicted to be positioned in the specified area whether or not the prescribed first condition relating to the number and respective power control values is satisfied. When the prescribed first condition is satisfied, the condition determination unit 332 may determine that it is better to continue output of radio signal. When the prescribed first condition is not satisfied, the condition determination unit 332 may determine that output of the radio signal needs not be continued.

In the above determination, the condition determination unit 332 may determine, for example, whether or not the prescribed first condition relating to number of the mobile station apparatus 500 presently positioned in the specified area and respective power control values is satisfied.

If it is better for the fifth base station apparatus 402 to continue output of the radio signal (operation MD: Y), the processing proceeds to operation ME. If fifth base station apparatus 402 needs not continue output of radio signal (operation MD: N), the processing is terminated. In operation ME, the second communication unit 321 transmits an instruction signal to the node apparatus 200 for causing the fifth base station apparatus 402 to continue output of the radio signal.

In the description that follows, the instruction signal transmitted from the first base station apparatus 300 for causing the fifth base station apparatus 402 to continue output of the radio signal may be denoted as "ON continue request signal".

Upon reception of the ON continue request signal, as upon reception of ON the request signal, the node apparatus 200 transmits the instruction signal for causing the fifth base station apparatus 402 to continue output of radio signal to the fifth base station apparatus 402. The instruction signal transmitted from the node apparatus 200 for causing the fifth base station apparatus 402 to continue output of radio signal may be denoted as "ON continue instruction signal".

Figure 42:
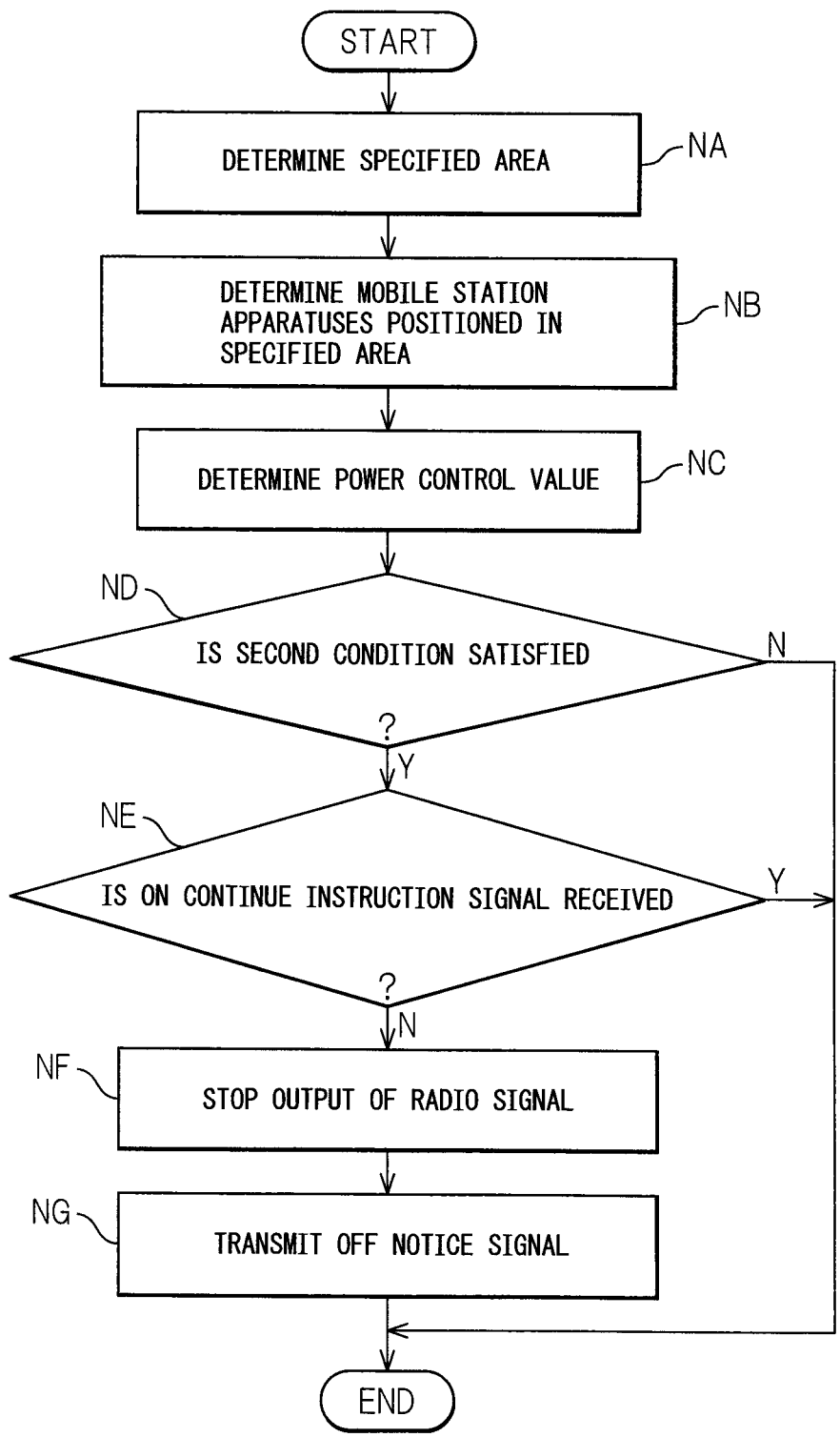
FIG. 42 is a view illustrating the processing in the fifth base station apparatus.

FIG. 42 is a view illustrating the processing in the fifth base station apparatus 402. In other embodiments, each of the following operations NA to NG may be a step. In operation NA, the specified area determination unit 430 determines the specified area.

In operation NB, the determination unit 425 determines the position of the mobile station apparatuses positioned in the specified area. In operation NC, the power control value determination unit 431 determines the power control values for the mobile station apparatuses 500 positioned in the cover area 612.

In operation ND, the condition determination unit 432 determines, for the mobile station apparatuses 500 positioned in the specified area, whether or not the prescribed second condition relating to the number and respective power control values is satisfied. If the prescribed second condition is satisfied (operation ND: Y), the processing proceeds to operation NE. If the prescribed second condition is not satisfied (operation ND: N), the processing is terminated. As a result, output of the radio signal is continued.

In operation NE, the second communication unit 421 attempts to receive ON continue instruction signal. If ON continue instruction signal is not received (operation NE: N), the processing proceeds to operation NF. If ON continue instruction signal is received (operation NE: Y), the processing is terminated. As a result, output of the radio signal is continued even if the prescribed second condition is satisfied.

In operation NF, the output control unit 426 stops output of radio signal from the fifth base station apparatus 402. In operation NG, the second communication unit 421 transits OFF notice signal to the node apparatus 200.

Referring to FIG. 40, the mobile station apparatuses 500a and 500b are moving toward the cover area 612 of the fifth base station apparatus 402. As a result, if it is determined in operation MD depicted in FIG. 41 that it is better for the fifth base station apparatus 402 to continue output of radio signal, the first base station apparatus 300 transmits the ON continue request signal to the node apparatus 200 for causing the fifth base station apparatus 402 to continue output of radio signal. Upon reception of the ON continue request signal, the node apparatus 200 transmits ON continue instruction signal to the fifth base station apparatus 402.

On the other hand, the mobile station apparatuses 500c and 500d are moving out of the cover area 612 of the fifth base station apparatus 402. As a result, if it is determined, in operation ND depicted in FIG. 42, that the prescribed second condition is satisfied, then it is determined whether or not ON continue instruction signal is received in the fifth base station apparatus 402. If the ON continue instruction signal is not received, the fifth base station apparatus 402 stops output of radio signal. If the ON continue instruction signal is received, the fifth base station apparatus 402 continues to output radio signal. Thus, when the processing for causing the fifth base station apparatus 402 to continue output of radio signal competes with the processing for stopping output, continuance of output of radio signal takes priority.

According to the present exemplary embodiment, after output of radio signal from the fifth base station apparatus 402 is started, occasion of stopping output of radio signal due to transient situation is reduced. As a result, deterioration of communication quality due to intermittent output of the radio signal from the fifth base station apparatus 402 can be prevented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A control method for controlling base station apparatuses used in a communication system comprising a first base station apparatus, a second base station apparatus, and one or more mobile station apparatuses, comprising: determining whether or not a first condition relating to the number of said mobile station apparatuses positioned in the overlapping area of the cover area of said first base station apparatus and the cover area of said second base station apparatus and to respective output power of said mobile station is satisfied; and outputting radio signal from said second base station apparatus if said first condition is satisfied.

2. The control method according to claim 1, further comprising: determining whether or not a second condition relating to the number of said mobile station apparatuses positioned in the overlapping area of the cover area of said first base station apparatus and the cover area of said second base station apparatus and to respective output power of said mobile station is satisfied; and stopping output of radio signal from said second base station apparatus if said second condition is satisfied.

3. The control method according to claim 2, wherein said second condition is satisfied if the number of said mobile station apparatuses that output signal at an output intensity exceeds a threshold.

4. The control method according to claim 2, wherein said second condition is satisfied if the number of said mobile station apparatuses that output signal at an output intensity is less than a threshold.

5. The control method according to claim 2, wherein said second condition is satisfied if, for plural output power not less than a first threshold, total sum of the number of said mobile station apparatuses outputting signal at each output power value multiplied by respective output power value exceeds a second threshold.

6. The control method according to claim 1, wherein said first condition is satisfied if the number of said mobile station apparatuses that output signal at an output intensity exceeds a threshold.

7. The control method according to claim 1, wherein said first condition is satisfied if, for plural output power not less than a first threshold, total sum of the number of said mobile station apparatuses outputting signal at each output power value multiplied by respective output power value exceeds a second threshold.

8. A control method for controlling base station apparatuses used in a communication system comprising a first base station apparatus, a second base station apparatus, and one or more mobile station apparatuses, comprising: determining whether or not a second condition relating to the number of said mobile station apparatuses positioned in the overlapping area of the cover area of said first base station apparatus and the cover area of said second base station apparatus and to respective output power of said mobile station is satisfied; and stopping output of radio signal from said second base station apparatus if said second condition is satisfied.

9. The control method according to claim 8, further comprising: measuring the position of said mobile station apparatuses; predicting the mobile station apparatuses positioned in said overlapping area in a time period based on the change of the position of said mobile station apparatuses; determining whether or not a first condition relating to the number of said mobile station apparatuses predicted to be positioned in said overlapping area and respective power output of said mobile station is satisfied; and if said first condition and said second condition are both satisfied, outputting radio signal from said second base station apparatus in preference.

10. The control method according to claim 8, wherein said first condition is satisfied if the number of said mobile station apparatuses that output signal at an output intensity exceeds a threshold.

11. The control method according to claim 8, wherein said first condition is satisfied if, for plural output power not less than a first threshold, total sum of the number of said mobile station apparatuses outputting signal at each output power value multiplied by respective output power value exceeds a second threshold.

12. A base station apparatus used as a first base station apparatus in a communication system including said first base station apparatus, a second base station apparatus, and one or more mobile station apparatuses, said first base station apparatus comprising: a first determination unit that determines whether or not a first condition relating to the number of said mobile station apparatuses positioned in the overlapping area of the cover area of said first base station apparatus and the cover area of said second base station apparatus and respective output power of said mobile station apparatuses is satisfied; and an instruction signal transmission unit which transmits an instruction signal for causing said second base station apparatus to output radio signal if said first condition is satisfied.

13. A base station apparatus used as a second base station apparatus in a communication system including said first base station apparatus, a second base station apparatus, and one or more mobile station apparatuses, said second base station apparatus comprising: a second determination unit determines whether or not a second condition relating to the number of said mobile station apparatuses positioned in the overlapping area of the cover area of said first base station apparatus and the cover area of said second base station apparatus and respective output power of said mobile station apparatuses is satisfied; and an output control unit that stops output of radio signal from said second base station apparatus if said second condition is satisfied.

* * * * *